United States Patent
Hayashi et al.

(10) Patent No.: US 11,830,985 B2
(45) Date of Patent: Nov. 28, 2023

(54) SOLID ELECTROLYTE FOR ALL-SOLID SODIUM BATTERY, METHOD FOR PRODUCING SAME, AND ALL-SOLID SODIUM BATTERY

(71) Applicant: UNIVERSITY PUBLIC CORPORATION OSAKA, Osaka (JP)

(72) Inventors: Akitoshi Hayashi, Sakai (JP); Masahiro Tatsumisago, Sakai (JP); Atsushi Sakuda, Sakai (JP)

(73) Assignee: University Public Corporation Osaka, Osaka (JP)

( * ) Notice: Subject to any disclaimer, the term of this patent is extended or adjusted under 35 U.S.C. 154(b) by 389 days.

(21) Appl. No.: 17/260,361

(22) PCT Filed: Jul. 23, 2019

(86) PCT No.: PCT/JP2019/028881
§ 371 (c)(1),
(2) Date: Jan. 14, 2021

(87) PCT Pub. No.: WO2020/022342
PCT Pub. Date: Jan. 30, 2020

(65) Prior Publication Data
US 2021/0296707 A1    Sep. 23, 2021

(30) Foreign Application Priority Data

Jul. 24, 2018    (JP) ................................ 2018-138690

(51) Int. Cl.
*H01M 10/36* (2010.01)
*H01M 4/04* (2006.01)
*H01M 4/02* (2006.01)

(52) U.S. Cl.
CPC ......... *H01M 10/36* (2013.01); *H01M 4/0407* (2013.01); *H01M 2004/027* (2013.01); *H01M 2004/028* (2013.01); *H01M 2300/0068* (2013.01)

(58) Field of Classification Search
CPC ......... H01M 10/36; H01M 2300/0068; H01M 2004/028; H01M 2004/027; H01M 4/0407
See application file for complete search history.

(56) References Cited

U.S. PATENT DOCUMENTS

2010/0203383 A1* 8/2010 Weppner ............... C04B 35/486
252/519.15

FOREIGN PATENT DOCUMENTS

CN          105845976 A  *  8/2016
KR          2018-0080501 A    7/2018

OTHER PUBLICATIONS

Modified translation, CN-105845976-A as taught by Yang (Year: 2016).*

(Continued)

*Primary Examiner* — Cynthia H Kelly
*Assistant Examiner* — Tarik J Phillip
(74) *Attorney, Agent, or Firm* — Stites & Harbison, PLLC; Jeffrey A. Haeberlin; Trevor T. Graves

(57) ABSTRACT

A solid electrolyte for an all-solid-state sodium battery, represented by formula: $Na_{3-x}Sb_{1-x}\alpha_x S_4$, wherein $\alpha$ is selected from elements that provide $Na_{3-x}Sb_{1-x}\alpha_x S_4$ exhibiting a higher ionic conductivity than $Na_3 SbS_4$, and x is $0<x<1$.

12 Claims, 15 Drawing Sheets

(56) References Cited

OTHER PUBLICATIONS

Zhang et al.;Mechanisms and properties of ion-transport in inorganic solid electrolytes (Year: 2017).*
Tamura et al. Divalent Sr2+ Cation Conducting Solid Electrolyte with NASICON-type Structure (Year: 2014).*
Wang, H., et al., "An Air-Stable Na3SbS4 Superionic Conductor Prepared by a Rapid and Economic Synthetic Procedure," Angew. Chem. Int. Ed., 55 (2016) 8551-8555.
Banerjee, A., et al., "Na3SbS4: A Solution Processable Sodium Superionic Conductor for All-Solid-State Sodium-Ion Batteries," Angew. Chem. Int. Ed., 55 (2016) 9634-9638.
European Patent Office, Extended European Search Report issued in corresponding Application No. EP 19 839 933.9, dated Mar. 4, 2022.

* cited by examiner

SOLID ELECTROLYTE FOR ALL-SOLID SODIUM BATTERY, METHOD FOR PRODUCING SAME, AND ALL-SOLID SODIUM BATTERY

TECHNICAL FIELD

The present invention relates to a solid electrolyte for an all-solid-state sodium battery, a method for producing the same and an all-solid-state sodium battery. More specifically, the present invention relates to a solid electrolyte with improved ionic conductivity for an all-solid-state sodium battery, a method for producing the same and an all-solid-state sodium battery including the solid electrolyte.

BACKGROUND ART

In recent years, demand for lithium-ion batteries for storing electric power has grown in automobiles such as electric vehicles and hybrid vehicles, power-generating devices such as solar batteries and wind generators, and the like. However, therefore lithium-ion batteries use lithium whose reserves are small and which is produced in limited areas, and naturally abundant sodium is proposed, in place of lithium, for use in batteries.

From a point of view of assurance of safety, all-solid-state sodium batteries using a solid electrolyte instead of liquid electrolyte have been actively studied.

From a point of view of improvement of properties of the all-solid-state sodium batteries, such as discharge capacity, the solid electrolyte is required to have higher ionic conductivity. Particularly from a point of view of improvement of properties of all-solid-state sodium secondary batteries, such as charge/discharge capacity and cycle number, the solid electrolyte is required to have higher ionic conductivity. As such, A. Banerjee, et al. *Angew. Chem. Int. Ed.* 55. (2016): 9634. (non-patent literature 1) and H. Wang, et al. *Angew. Chem. Int. Ed.* 55. (2016): 9551. (non-patent literature 2) report that $Na_3SbS_4$ exhibits high ionic conductivity as well as high atmospheric stability.

CITATION LIST

Non-Patent Literature

[NPL 1] A. Banerjee, et al. *Angew. Chem. Int. Ed.* 55. (2016): 9634.
[NPL 2] H. Wang, et al. *Angew. Chem. Int. Ed.* 55. (2016): 9551.

SUMMARY OF INVENTION

Technical Problem

The above-described $Na_3SbS_4$ did not have sufficient ionic conductivity, since it was desired to provide a solid electrolyte exhibiting a higher ionic conductivity.

Solution to Problem

The inventors of the present invention sought to partially substitute Sb in $Na_3SbS_4$ with another metal ion. As a result, the inventors found that a solid electrolyte exhibiting a higher ionic conductivity than $Na_3SbS_4$ can be provided when pentavalent Sb is partially substituted with an element that is not pentavalent to introduce defects in the $Na_3SbS_4$ structure, thereby arriving at the present invention. Thus, the present invention provides a solid electrolyte for an all-solid-state sodium battery, represented by formula:

$$Na_{3-x}Sb_{1-x}\alpha_xS_4$$

wherein α is selected from elements that provide $Na_{3-x}Sb_{1-x}\alpha_xS_4$ exhibiting a higher ionic conductivity than $Na_3SbS_4$, and x is 0<x<1.

The present invention also provides a method for producing the solid electrolyte, including mixing raw materials for production of the solid electrolyte with mechanical milling, and pressing the obtained mixture.

The present invention further provides an all-solid-state sodium battery including a positive electrode, a negative electrode, and a solid electrolyte layer between the positive electrode and the negative electrode, wherein the solid electrolyte layer contains the solid electrolyte.

Advantageous Effects of Invention

The present invention can provide a solid electrolyte exhibiting a higher ionic conductivity, a method for producing the same and an all-solid-state sodium battery including the solid electrolyte.

The present invention can provide a solid electrolyte exhibiting an even higher ionic conductivity when any of the configurations indicated below are fulfilled.

(1) α is W or Mo.
(2) x is 0.05≤x≤0.2.
(3) The solid electrolyte is in the form of glass ceramics.
(4) The solid electrolyte contains at least a crystalline part and the crystalline part contains a cubic crystal.
(5) The solid electrolyte exhibits an anion peak derived from $\alpha S_4$ in a Raman spectrum.
(6) Raw materials for production of the solid electrolyte are mixed by mechanical milling and the obtained mixture is pressed.
(7) The solid electrolyte is pressed at pressure of 300 MPa or more and heated at a temperature of 250° C. to 300° C. for 0.1 hours or more.

DESCRIPTION OF EMBODIMENTS

Solid Electrolyte for All-Solid-State Sodium Battery

Figure 1:
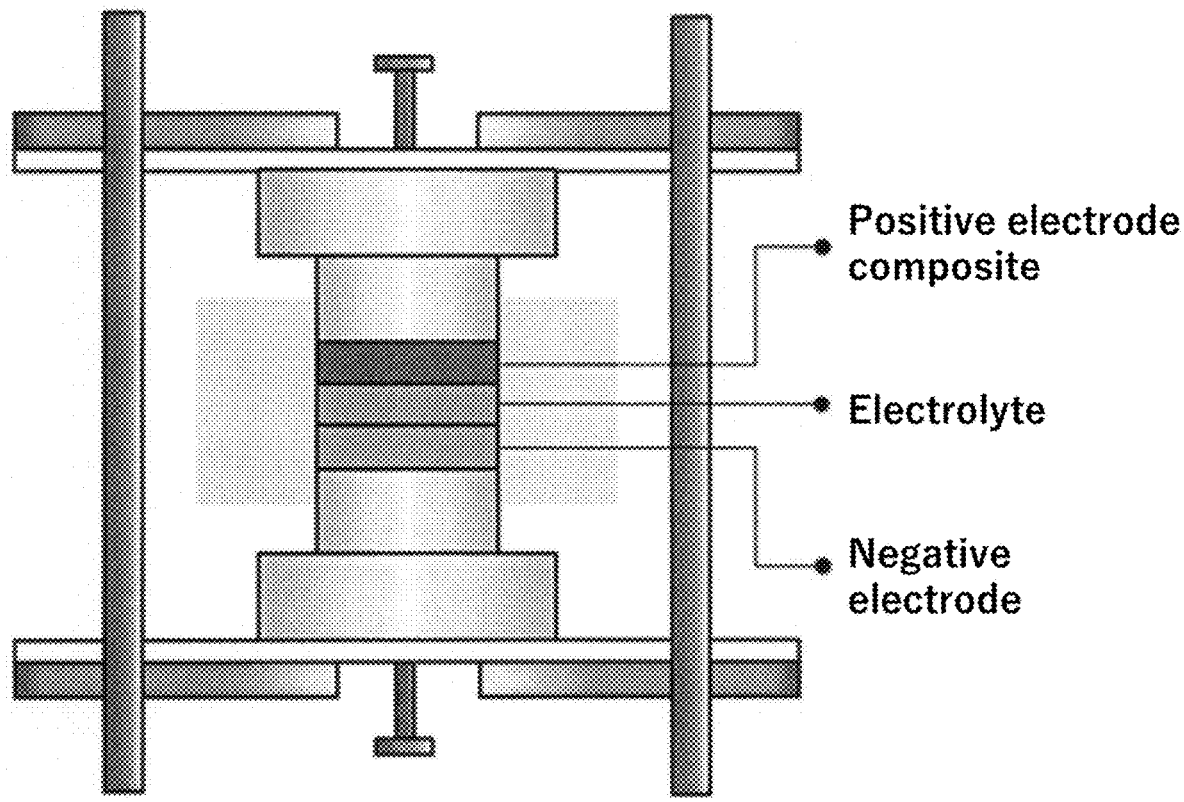
FIG. 1 illustrates a model of all-solid-state battery including $Na_{2.88}Sb_{0.88}W_{0.12}S_4$ gc.

The solid electrolyte is represented by formula:

$$Na_{3-x}Sb_{1-x}\alpha_xS_4.$$

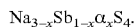

In the formula, α is selected from elements that provide Na$_{3-x}$Sb$_{1-x}$α$_x$S$_4$ exhibiting a higher ionic conductivity than Na$_3$SbS$_4$. α may be one kind or may be a combination of more than one kind.

α is preferably selected from hexavalent elements. Examples of the hexavalent element include W, Mo, Cr, Mn, Ru, Re, Os and Ir. Particularly, the hexavalent element is preferably selected from W and Mo, and is still more preferably W.

x is 0<x<1. x may be any of various values such as 0.001, 0.002, 0.004, 0.006, 0.008, 0.01, 0.012, 0.015, 0.02, 0.05, 0.1, 0.2, 0.5, 0.75 and 0.9. The range of x varies according to the valence of α. x preferably represents a value within a range that can provide the solid electrolyte exhibiting a higher ionic conductivity than Na$_3$SbS$_4$. x is more preferably 0.05≤x≤0.2.

α may be partially substituted with an element of group 7 such as Mn, group 13 such as B, Al or Ga, group 14 such as C, Si, Ge, Sn or Pb, or group 15 such as P, As or Bi. The fraction of substitution may be less than 50 atomic %. The fraction of substitution may be, for example, 0%, 1%, 2%, 5%, 10%, 15%, 20%, 25%, 30%, 35%, 40%, 45%, 49% and 49.9%.

S may be substituted with another element or molecule. Examples of another element or molecule include F, Cl, Br, I, NO$_3$, PF$_6$, ClO$_4$, BH$_4$, CF$_3$SO$_3$, (CF$_3$SO$_2$)$_2$N, (C$_2$F$_5$SO$_2$)$_2$N, (FSO$_2$)$_2$N and [B(C$_2$O$_4$)$_2$]. The fraction of substitution may be expressed as 0<Y<3 in the formula of Na$_{3-x}$Sb$_{1-x}$A$_x$S$_{4-Y}$β$_Y$. β may be one kind or may be a combination of more than one kind.

Y may be any of various values such as 0.001, 0.002, 0.004, 0.006, 0.008, 0.01, 0.012, 0.015, 0.02, 0.05, 0.1, 0.5, 0.75, 1.5, 2.5 and 2.9. The range of Y varies according to the valence the substituent.

The solid electrolyte may be in the form of glass or glass ceramics. The expression "in the form of glass" means "in a substantial amorphous state". The term "substantial amorphous state" as used herein encompasses the state where crystalline phases are finely dispersed in an amorphous matrix, in addition to 100% amorphous state. The expression "in the form of glass ceramics" means the form obtained after heating the solid electrolyte in the form of glass at a temperature at or above the glass transition point.

The solid electrolyte in the form of glass ceramics may be in a state where at least crystalline phases are dispersed in an amorphous glass matrix. The proportion of crystalline phases may be any of various values such as 0.001%, 0.011%, 0.1%, 1%, 3%, 5%, 10%, 15%, 20%, 25%, 30%, 35%, 40%, 45%, 50%, 55%, 60%, 65%, 70%, 75%, 80%, 85%, 90%, 95%, 97%, 99%, 99.9% and 100%. The proportion of crystalline phase may be 50% by mass or more, or 80% by mass or more relative to the entire glass ceramics. The proportion of crystalline phases can be measured by solid-state NMR.

The crystalline phases may have a cubic crystal structure and/or a tetragonal crystal structure. The crystalline phases preferably have a cubic crystal structure.

The solid electrolyte in the form of glass ceramics may not have a glass transition point that the corresponding solid electrolyte in the form of glass has.

The solid electrolyte may be made of one type or a mixture of more than one type.

The solid electrolyte may exhibit an anion peak derived from αS$_4$ in a Raman spectrum obtained by Raman spectroscopy. The solid electrolyte exhibiting such an anion peak in a Raman spectrum, has a crystalline structure derived from αS$_4$, and therefor has an improved ionic conductivity.

Method for Producing Solid Electrolyte

Methods for producing the solid electrolyte are not particularly limited as long as raw materials thereof can be mixed. Examples of the raw materials include Na$_2$S, Sb$_2$S$_3$, S and αS$_z$ (wherein z is a number defined according to the valence of α) and a sodium salt of β. A preferable method that allows mixing is by mechanical milling for more uniformly mixing the components.

Devices and conditions for mechanical milling are not particularly limited as long as the components are uniformly mixed.

The device used may be generally a ball mill. A ball mill is preferable because of high mechanical energy provided thereby. Among ball mills, a planetary ball mill is preferable because pots are rotated while a disk is revolutionary rotated in the opposite direction to the rotation of the pots, thereby efficiently generating high impact energy.

The treatment conditions may be appropriately set according to the device used. Where, for example, a ball mill is used, raw materials can be uniformly mixed as the rotation speed increases and/or the treatment time increases. Specifically, where a planetary ball mill is used, the treatment conditions may be a rotation speed of 50 to 600 rpm, a treatment time of 0.1 to 100 hours and 1 to 100 kWh/kg of raw materials.

By the mechanical milling, the solid electrolyte in the form of glass is obtained. The solid electrolyte in the form of glass ceramics may be obtained by heating the solid electrolyte in the form of glass at a temperature at or above the glass transition point (such as a temperature of 100° C. to 400° C.). The heating temperature may be, for example, 100° C., 150° C., 200° C., 250° C., 275° C., 300° C., 350° C. or 400° C. The heating time may be 10 minutes to 24 hours. The heating time may be, for example, 10 minutes, 1 hour, 1.5 hours, 3 hours, 6 hours, 10 hours, 12 hours, 20 hours or 24 hours.

All-Solid-State Sodium Battery

The all-solid-state sodium battery may be a primary or secondary battery. Where the battery is a secondary battery, the charge/discharge capacity and/or cycle number can be improved. The all-solid-state sodium battery can be used at, for example, −100° C. to 100° C.

The all-solid-state sodium battery includes a positive electrode, a negative electrode, and a solid electrolyte layer between the positive electrode and the negative electrode.

The solid electrolyte layer contains the solid electrolyte.

The solid electrolyte layer may contain another component used for all-solid-state sodium batteries in addition to the solid electrolyte. Examples of the component include an oxide of a metal such as P, As, Ti, Fe, Zn and Bi and a binder such as polyvinylidene fluoride, polytetrafluoroethylene, polyvinyl alcohol, polyvinyl acetate, polymethyl methacrylate and polyethylene.

The solid electrolyte layer may be formed by, for example, pressing the solid electrolyte so as to obtain a predetermined thickness. The pressing may be carried out at a pressure of 100 to 2000 MPa. The pressure may be, for example, 100 MPa, 200 MPa, 300 MPa, 360 MPa, 500 MPa, 700 MPa, 1000 MPa, 1080 MPa, 1500 MPa or 2000 MPa. The solid electrolyte layer may have a thickness of, for example, 0.1 to 1 mm. The thickness may be, for example, 0.1 mm, 0.15 mm, 0.2 mm, 0.25 mm, 0.3 mm, 0.4 mm, 0.5 mm, 0.6 mm, 0.7 mm, 0.75 mm, 0.8 mm, 0.9 mm or 1.0 mm.

The positive electrode is not particularly limited. The positive electrode may be made of a positive electrode active material only or may be a positive electrode composite in which a positive electrode active material is mixed with an optional material(s) such as a binder, a conductive material, and an electrolyte.

Examples of the positive electrode active material include $Na_4Ti_5O_{12}$, $NaCoO_2$, $NaMnO_2$, $NaVO_2$, $NaCrO_2$, $NaNiO_2$, $Na_2NiMn_3O_8$, $NaNi_{1/3}Co_{1/3}Mn_{1/3}O_2$, S, $Na_2S$, FeS, $TiS_2$, $NaFeO_2$, $Na_3V_2(PO_4)_3$, $NaMn_2O_4$ and $Na_2TiS_3$. The positive electrode active material may be coated with a material such as $NaNbO_3$, $Al_2O_3$ or NiS. Examples of the binder include polyvinylidene fluoride, polytetrafluoroethylene, polyvinyl alcohol, polyvinyl acetate, polymethyl methacrylate and polyethylene.

Examples of the conductive material include natural graphite, artificial graphite, acetylene black, Ketjen black, Denka black, carbon black and vapor-grown carbon fiber (VGCF).

Examples of the electrolyte include those commonly used in solid electrolyte layers. The solid electrolyte of the present invention may also be used.

The positive electrode (positive electrode composite) may be obtained in the form of pellet by pressing.

The negative electrode is not particularly limited. The negative electrode may contain a negative electrode active material only or may be a negative electrode composite in which a negative electrode active material is mixed with a binder, a conductive material, an electrolyte, etc.

Examples of the negative electrode active material include metals such as Na, In, Sn and Sb, an Na alloy, graphite, hard carbon and various transition metal oxides such as $Na_{4/3}Ti_{5/3}O_4$, $Na_3V_2(PO_4)_3$ and SnO.

The binder, the conductive material and the electrolyte may be those mentioned above in the section for the positive electrode.

The negative electrode (negative electrode composite) may be obtained in the form of pellet by pressing. The negative electrode active material may be a metal sheet (foil) made of a metal or an alloy as it is.

The positive electrode and/or negative electrode may be formed on a current collector of SUS (stainless steel), aluminum, copper or the like.

The all-solid-state sodium battery may be obtained by, for example, stacking the positive electrode, the solid electrolyte layer and the negative electrode and pressing the same.

A layer of metal selected from Au, Pt, In, Al, Sn, Si and the like may be provided between the negative electrode and the solid electrolyte layer. Such a metal layer may be provided between the positive electrode and the solid electrolyte layer.

The metal layer(s) may partly cover the negative electrode and/or positive electrode, and preferably covers the entire surface thereof in terms of further extending the cycle life.

The metal layer may be formed by a vapor phase method. The vapor phase method allows formation of a dense metal layer on the surface of the solid electrolyte layer with good adhesion. As a result, generation of dendrites due to dissolution and deposition of Na during of charging/discharging can be suppressed, thereby extending the cycle life. The metal layer is also preferably formed so that the roughness on the surface of the metal layer is smaller than that on the surface of the solid electrolyte layer. By forming the metal layer as above, the adhesion between the solid electrolyte layer and the negative electrode and/or positive electrode can be improved, resulting in provision of an all-solid-state sodium secondary battery having a long cycle life.

Examples of the vapor phase method include vapor deposition, CVD and sputtering. Among these, vapor deposition is convenient.

The all-solid-state sodium battery according to the present invention is prepared to have the above configurations, and thus can have a charge/discharge capacity of 250 mAh g$^{-1}$ or more.

The thickness of the metal layer is not particularly limited as long as the reversibility of the dissolution and deposition of Na can be improved. The thickness may be, for example, 0.01 to 10 μm. The metal layer may have a thickness of, for example, 0.01 μm, 0.02 μm, 0.03 μm, 0.04 μm, 0.05 μm, 0.06 μm, 0.07 μm, 0.08 μm, 0.09 μm, 0.10 μm, 0.25 μm, 0.50 μm, 0.75 μm, 1.00 μm, 1.25 μm, 1.50 μm, 2.00 μm, 2.50 μm, 3.00 μm, 4.00 μm, 5.00 μm, 6.00 μm, 7.00 μm, 8.00 μm, 9.00 μm, 9.90 μm or 10.00 μm. The thickness is more preferably 0.03 to 0.1 μm.

EXAMPLES

The present invention is more specifically described hereinafter by way of Examples and Comparative Examples which do not limit the present invention. In Examples and Comparative Examples hereinbelow, $Na_2S$ used was manufactured by Nagao &, Co., Ltd. (purity>99.1%), $Sb_2S_3$ used was manufactured by Nihon Seiko Co., Ltd. (purity>98%), S used was manufactured by Aldrich (purity>99.98%), $WS_2$ used was manufactured by Aldrich (purity: 99%), $MoS_2$ used was manufactured by Aldrich (purity: unknown), $SnS_2$ used was manufactured by Mitsuwa Chemicals Co., Ltd. (purity: 99.5%) and $SiS_2$ used was manufactured by Furuuchi Chemical Corporation (purity: 99.9%).

Example 1

Preparation of $Na_{3-x}Sb_{1-x}W_xS_4$ $Na_2S$, $Sb_2S_3$, S and $WS_2$ at the compositions indicated in Table 1 below were mixed and charged into a planetary ball mill.

TABLE 1

| | $Na_{3-x}Sb_{1-x}W_xS_4[(100 \cdot y)Na_3SbS_4 + yNa_2WS_4]$ | | | |
|---|---|---|---|---|
| | $Na_2S$ | $Sb_2S_3$ | S | $WS_2$ |
| x = 0 | 50.0 | 16.7 | 33.3 | — |
| x = 0.06 | 49.0 | 15.7 | 33.3 | 2.0 |

TABLE 1-continued $Na_{3-x}Sb_{1-x}W_xS_4[(100-y)Na_3SbS_4 + yNa_2WS_4]$

|  | $Na_2S$ | $Sb_2S_3$ | S | $WS_2$ |
|---|---|---|---|---|
| x = 0.12 | 48.0 | 14.7 | 33.3 | 4.0 |
| x = 0.15 | 47.5 | 14.2 | 33.3 | 5.0 |
| x = 0.18 | 47.0 | 13.7 | 33.3 | 6.0 |

(molar ratio)

After being charged, mechanical milling was carried out to obtain $Na_{3-x}Sb_{1-x}W_xS_4$ (milled samples: ms) in the form of glass.

The planetary ball mill used was Pulverisette P-7 manufactured by Fritsch GmbH having pots and balls made of $ZrO_2$ with 250 balls of a diameter of 4 mm being included in each 45-ml pot. Mechanical milling was carried out with a charged sample amount of 0.5 g, a rotation speed of 510 rpm at room temperature in a dry argon-filled glove box for 5 (x=0), 15 (x=0.12) or 30 hours.

The above production method is in accordance with the descriptions in "Experimental" in Akitoshi Hayashi et al., Journal of Non-Crystalline Solids 356 (2010), p. 2670-2673.

The $Na_{3-x}Sb_{1-x}W_xS_4$ in the form of glass (about 150 mg) was pressed at room temperature for 5 minutes (pressure: 360 MPa to 1080 MPa) to obtain $Na_{3-x}Sb_{1-x}W_xS_4$ pellets each having a thickness of about 1 mm.

The $Na_{3-x}Sb_{1-x}W_xS_4$ pellets were heated at 250° C. (x=0) to 275° C. for 1.5 hours or 6.0 hours to obtain glass ceramics $Na_{3-x}Sb_{1-x}W_xS_4$ pellets (glass-ceramics: gc).

The pellets obtained in Example 1 were subjected to differential thermal analysis (DTA), DTA curves were prepared and the temperature properties of the pellets were measured. The differential thermal analysis instrument used was Thermo Plus 8120 manufactured by Rigaku Corporation.

The pellets obtained in Example 1 were also subjected to alternative current impedance measurement, impedance plots were prepared and the resistance was compared therebetween. The impedance analyzer used was SI-1260 manufactured by Solartron Analytical.

The pellets obtained in Example 1 were further subjected to measurements of direct-current polarization, ionic conductivity and electronic conductivity. The direct-current polarization, ionic conductivity and electronic conductivity were measured on SI-1287 manufactured by Solartron Analytical.

The pellets obtained in Example 1 were also used for XRD (X-ray diffractometry) in order to compare XRD patterns. The X-ray diffractometer used was SmartLab manufactured by Rigaku Corporation and the structural analysis was carried out with CuKα radiation in the range of 2θ=100 to 90°.

Example 2

Preparation of $Na_{3-x}Sb_{1-x}Mo_xS_4$ $Na_2S$, $Sb_2S_3$, S and $MoS_2$ at the compositions indicated in Table 2 below were mixed and subjected to mechanical milling in the same manner as in Example 1 for 0 (x=0) or 15 hours to obtain $Na_{3-x}Sb_{1-x}Mo_xS_4$ in the form of glass.

TABLE 2

$Na_{3-x}Sb_{1-x}Mo_xS_4[(100-y)Na_3SbS_4 + yNa_2MoS_4]$

|  | $Na_2S$ | $Sb_2S_3$ | S | $MoS_2$ |
|---|---|---|---|---|
| x = 0 | 50 | 16.7 | 33.3 | — |
| x = 0.12 | 48 | 14.7 | 33.3 | 4.0 |
| x = 0.18 | 47 | 13.7 | 33.3 | 6.0 |

(molar ratio)

In the same procedure as in Example 1, about 150 mg of $Na_{3-x}Sb_{1-x}Mo_xS_4$ in the form of glass was pressed at room temperature for 5 minutes (pressure: 360 MPa) to obtain $Na_{3-x}Sb_{1-x}Mo_xS_4$ pellets each having a thickness of about 1 mm.

The $Na_{3-x}Sb_{1-x}Mo_xS_4$ pellets were heated at 275° C. for 1.5 hours in the same procedure as in Example 1 to obtain glass ceramics $Na_{3-x}Sb_{1-x}Mo_xS_4$ pellets.

Example 3

Preparation of $Na_{2.82}Sb_{0.88}W_{0.12}S_{3.94}Cl_{0.06}$ $Na_2S$, $Sb_2S_3$, S, $WS_2$ and NaCl were mixed at a molar ratio of 46:14.6:33.3:4:2, were subjected to mechanical milling for 30 hours in the same manner as in Example 1 to obtain $Na_{2.82}Sb_{0.88}W_{0.12}S_{3.94}Cl_{0.06}$ in the form of glass.

In the same procedure as in Example 1, about 150 mg of $Na_{2.82}Sb_{0.88}W_{0.12}S_{3.94}Cl_{0.06}$ in the form of glass was pressed at room temperature for 5 minutes (pressure: 360 MPa) to obtain $Na_{2.82}Sb_{0.88}W_{0.12}S_{3.94}Cl_{0.06}$ pellets each having a thickness of about 1 mm.

The $Na_{2.82}Sb_{0.88}W_{0.12}S_{3.94}Cl_{0.06}$ pellets were heated at 275° C. for 1.5 hours in the same procedure as in Example 1 to obtain glass ceramics $Na_{2.82}Sb_{0.88}W_{0.12}S_{3.94}Cl_{0.06}$ pellets.

$Na_3SbS_4$ (x=0 above) and the prepared $Na_{2.88}Sb_{0.88}W_{0.12}S_4$ were subjected to XRD (X-ray diffractometry) and XRD patterns were compared.

Example 4

Evaluation of Atmospheric Stability of $Na_{2.88}Sb_{0.88}W_{0.12}S_4$

The atmospheric stability of glass ceramics was evaluated using $Na_{2.88}Sb_{0.88}W_{0.12}S_4$ (x=0.12) prepared in Example 1. The $Na_{2.88}Sb_{0.88}W_{0.12}S_4$ pellets (0.1 g each) were atmospherically exposed at 24° C. to 26° C. and a relative humidity of 70%, and a change of the glass ceramics was observed by XRD analysis and a measurement of the $H_2S$ production over 100 minutes of time. The $H_2S$ production was calculated according to the equation indicated below:

$H_2S$ production=$(C \times L \times 10^{-6})/M$ [$cm^3 g^{-1}$]     (Equation 1)

C: $H_2S$ concentration [ppm], L: volume [$cm^3$], M: the sulfur amount [g] in the sample Example 5

Preparation of All-Solid-State Battery Containing $Na_{2.88}Sb_{0.88}W_{0.12}S_4$ gc An all-solid-state battery containing $Na_{2.88}Sb_{0.88}W_{0.12}S_4$ gc as an electrolyte was prepared. The fundamental structure of the battery is as shown in FIG. 1.

Acetylene black (AB)-$Na_{2.88}Sb_{0.88}W_{0.12}S_4$—$Na_2TiS_3$ (10 mg) was prepared as a positive electrode composite by mixing AB, $Na_{2.88}Sb_{0.88}W_{0.12}S_4$ gc and $Na_2TiS_3$, 80 mg of $Na_{2.88}Sb_{0.88}W_{0.12}S_4$ gc was prepared as an electrolyte and 40 mg of Na—Sn was prepared as a negative electrode. The materials were placed on SUS with the electrolyte being sandwiched between the positive electrode composite and the negative electrode so as to avoid direct contact therebetween, and another SUS was placed on the materials to sandwich the same, thereby preparing a battery. $Na_{2.88}Sb_{0.88}W_{0.12}S_4$ used was the one prepared in Example 1.

The obtained battery was subjected to the measurement of the charge/discharge capacity under the conditions of 25° C. with 5 charge/discharge cycles at a current density of 0.13 mAcm$^2$ in the range of 0.8 V to 3.2 V.

Comparative Example 1

Preparation of $Na_{2.88}Sb_{0.88}S_4$ $Na_2S$, $Sb_2S_3$ and S were mixed at a molar ratio of 1.44:0.44:1.90, and subjected to mechanical milling for 30 hours in the same manner as in Example 1 except that the amount of the sample charged was 0.6 g to obtain $Na_{2.88}Sb_{0.88}S_4$ in the form of glass.

In the same procedure as in Example 1, about 150 mg of $Na_{2.88}Sb_{0.88}S_4$ in the form of glass was pressed at room temperature for 5 minutes (pressure: 360 MPa) to obtain $Na_{2.88}Sb_{0.88}S_4$ pellets each having a thickness of about 1 mm. The $Na_{2.88}Sb_{0.88}S_4$ pellets were heated at 275° C. for 1.5 hours in the same procedure as in Example 1 to obtain glass ceramics $Na_{2.88}Sb_{0.88}S_4$ pellets.

Comparative Example 2

Preparation of $Na_{3+x}Sb_{1-x}Sn_xS_4$ $Na_2S$, $Sb_2S_3$, S and $SnS_2$ at the compositions indicated in Table 3 below were mixed and subjected to mechanical milling in the same procedure as in Example 1 for 3 hours to obtain $Na_{3+x}Sb_{1-x}Sn_xS_4$ in the form of glass.

TABLE 3

| | $Na_{3+x}Sb_{1-x}Sn_xS_4$ | | | |
|---|---|---|---|---|
| | $Na_2S$ | $Sb_2S_3$ | $SnS_2$ | S |
| x = 0 | 50.0 | 16.7 | 0.0 | 33.0 |
| x = 0.05 | 50.8 | 15.8 | 1.7 | 31.7 |
| x = 0.1 | 51.7 | 15.0 | 3.3 | 30.0 |
| x = 0.3 | 55.0 | 11.7 | 10.0 | 23.3 |

(molar ratio)

In the same procedure as in Example 1, $Na_{3+x}Sb_{1-x}Sn_xS_4$ in the form of glass was heated at 170° C. or 230° C. for 1.5 hours to obtain $Na_{3+x}Sb_{1-x}Sn_xS_4$ in the form of glass ceramics.

Comparative Example 3

Preparation of $Na_{3+x}Sb_{1-x}Si_xS_4$ $Na_2S$, $Sb_2S_3$, S and $SiS_2$ at the compositions indicated in Table 4 below were mixed and subjected to mechanical milling in the same procedure as in Example 1 for 5 (x=0) or 15 hours to obtain $Na_{3+x}Sb_{1-x}Si_xS_4$ in the form of glass.

TABLE 4

| | $Na_{3+x}Sb_{1-x}Si_xS_4$ | | | |
|---|---|---|---|---|
| | $Na_2S$ | $Sb_2S_3$ | $SiS_2$ | S |
| x = 0 | 50.0 | 16.7 | 0.0 | 33.0 |
| x = 0.03 | 50.5 | 16.2 | 1.0 | 32.3 |

TABLE 4-continued

| | $Na_{3+x}Sb_{1-x}Si_xS_4$ | | | |
|---|---|---|---|---|
| | $Na_2S$ | $Sb_2S_3$ | $SiS_2$ | S |
| x = 0.06 | 51.0 | 15.7 | 2.0 | 31.3 |
| x = 0.09 | 51.5 | 15.2 | 3.0 | 30.3 |

(molar ratio)

In the same procedure as in Example 1, $Na_{3+x}Sb_{1-x}Si_xS_4$ in the form of glass was heated between 250° C. to 280° C. for 1.5 hours to obtain $Na_{3+x}Sb_{1-x}Si_xS_4$ in the form of glass ceramics.

Discussion (1) XRD Analysis of $Na_{3-x}Sb_{1-x}W_xS_4$ ms of Example 1

Figure 2:
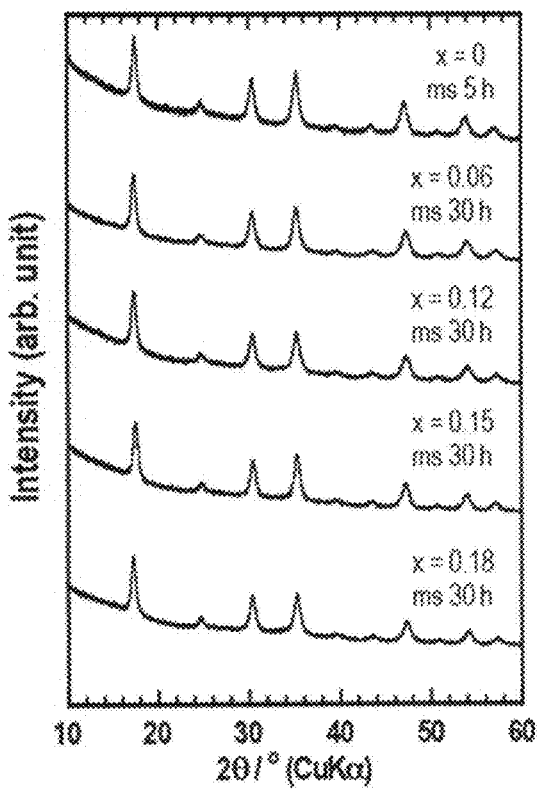
FIG. 2 shows XRD patterns of $Na_{3-x}Sb_{1-x}W_xS_4$ ms.

FIG. 2 shows XRD patterns of 4 types of ms pellets obtained in Example 1. It is found from FIG. 2 that even when the level of substitution of Sb with W is increased, the patterns are hardly changed, and the crystallinity is slightly decreased.

(2) Raman Spectrometry of $Na_{3-x}Sb_{1-x}W_xS_4$ ms of Example 1

Figure 3:
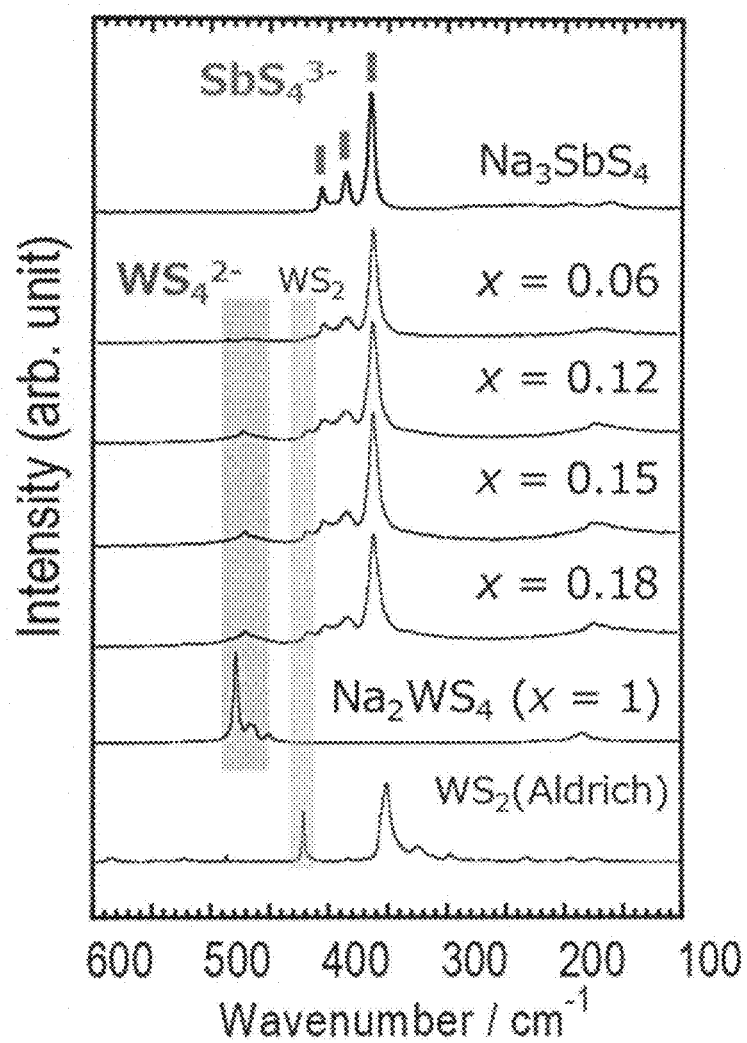
FIG. 3 shows Raman spectra of $Na_{3-x}Sb_{1-x}W_xS_4$ ms.

FIG. 3 shows the result of Raman spectrometry of 4 types of pellets obtained in Example 1. Peaks derived from $WS_2$ are detected in the colored area on the right hand side. Peaks derived from $WS_4^{2-}$ are detected in the colored region on the left hand side. The spectrum of the $Na_3SbS_4$ sample is shown at the top, the spectrum of the $WS_2$ sample is shown at the bottom, and the spectrum of the $Na_2WS_4$ sample is shown at the second from the bottom. $WS_2$ and $WS_4^{2-}$ peaks are detected in the samples after milling. It is found that $SbS_4^{3-}$ peaks derived from $Na_3SbS_4$ appear even in the compositions where Sb is substituted with W, and the $WS_4^{2-}$ skeleton peaks exist.

(3) Measurement of DTA Curves of $Na_{3-x}Sb_{1-x}W_xS_4$ ms of Example 1

Figure 4:
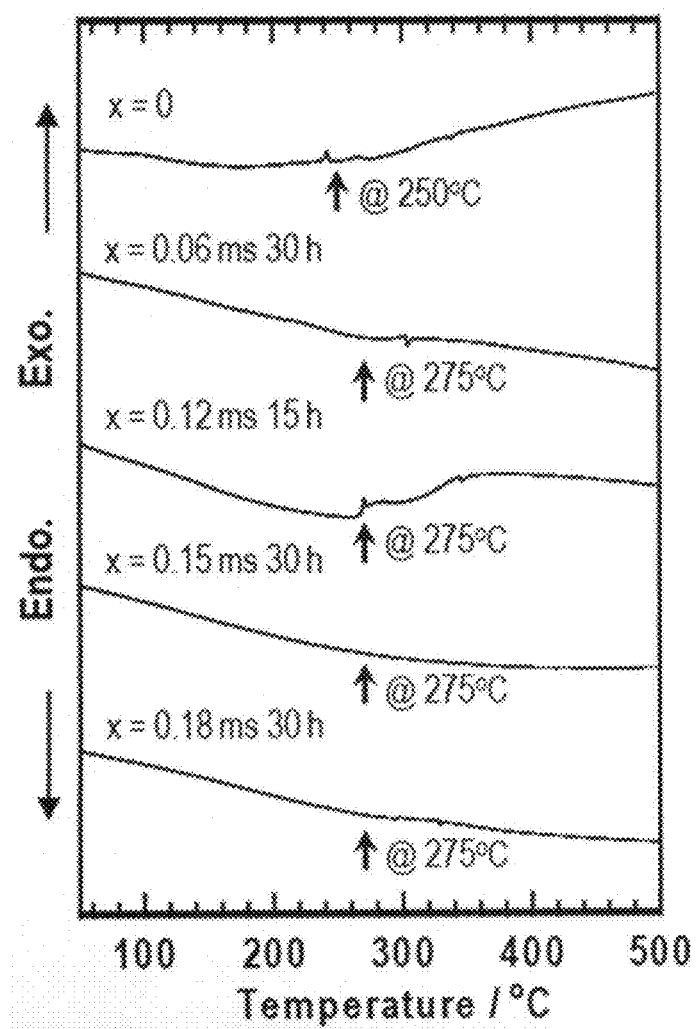
FIG. 4 shows DTA curves of $Na_{3-x}Sb_{1-x}W_xS_4$ ms.

FIG. 4 shows DTA curves of 4 types of pellets obtained in Example 1. No clear exothermic peak is detected in the spectrum of the sample of W=0.18.

(4) Impedance Plots of $Na_{3-x}Sb_{1-x}W_xS_4$ ms and gc of Example 1

Figure 5:
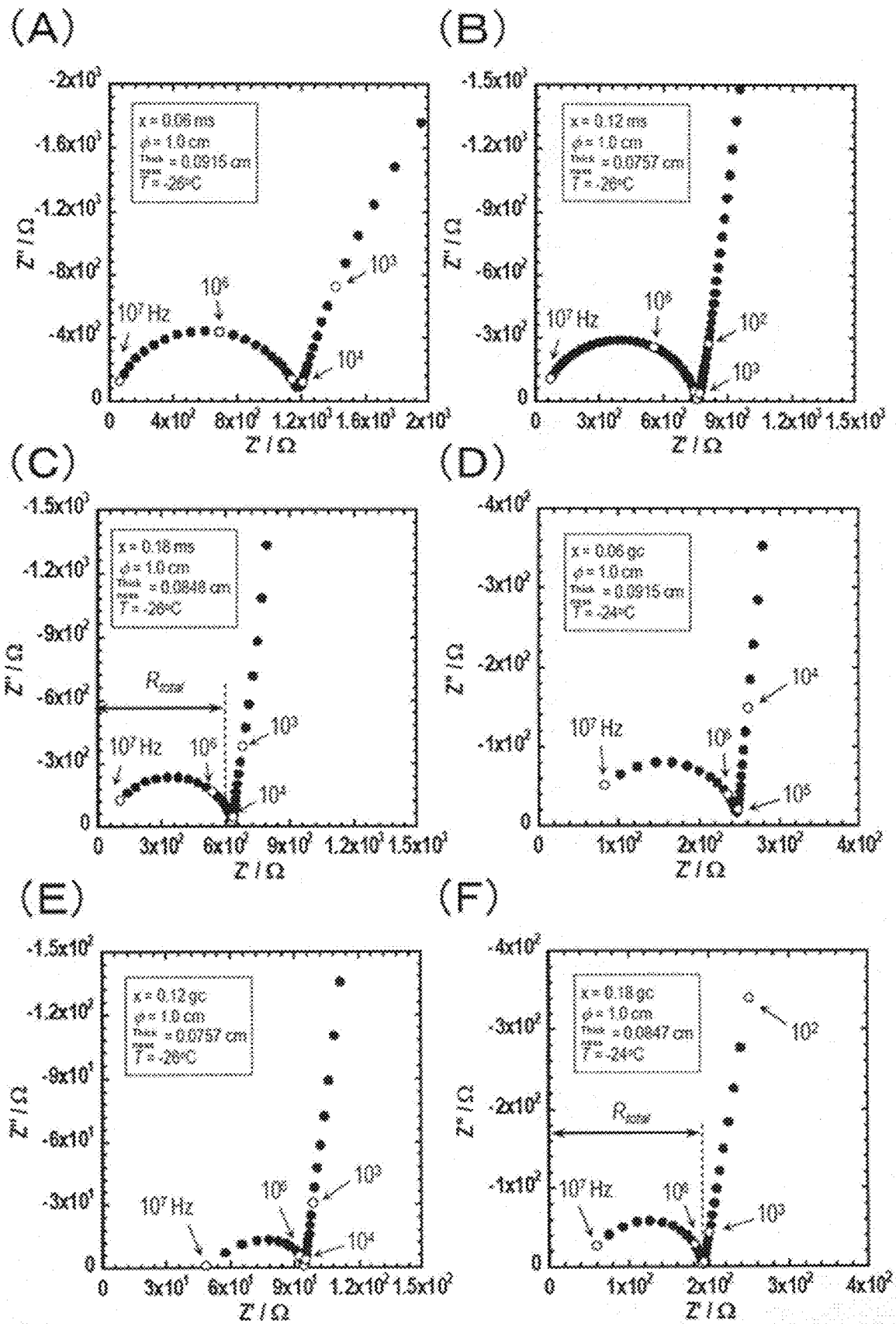
FIG. 5 shows impedance plots of $Na_{3-x}Sb_{1-x}W_xS_4$ ms and gc.

FIG. 5 (A) to (F) respectively show impedance plots of 3 types of W-containing ms and gc pellets obtained in Example 1. It is found that the grain resistance and the grain boundary resistance cannot be separated, and ms shows a higher resistance than gc.

(5) Temperature Dependence of Ionic Conductivity of $Na_{3-x}Sb_{1-x}W_xS_4$ ms and gc of Example 1

Figure 6:
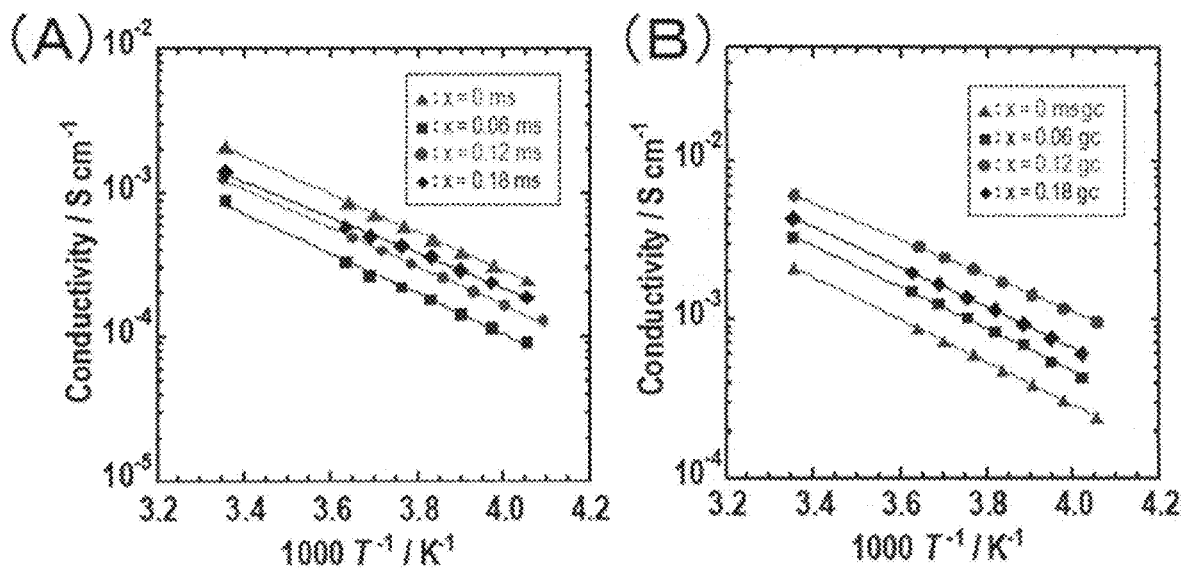
FIG. 6 shows temperature dependence of ionic conductivity of $Na_{3-x}Sb_{1-x}W_xS_4$ ms and gc.

FIGS. 6 (A) and (B) respectively show the temperature dependent ionic conductivity, the results of plotting conductivity against the reciprocal number of the absolute temperature for the 4 types of ms and gc pellets obtained. It is found from FIG. 6(A) that ms shows a maximum ionic conductivity when x=0. It is found from FIG. 6(B) that gc shows, unlike ms, a maximum ionic conductivity when x=0.12.

(6) XRD Analysis of $Na_{3-x}Sb_{1-x}W_xS_4$ gc of Example 1

Figure 7:
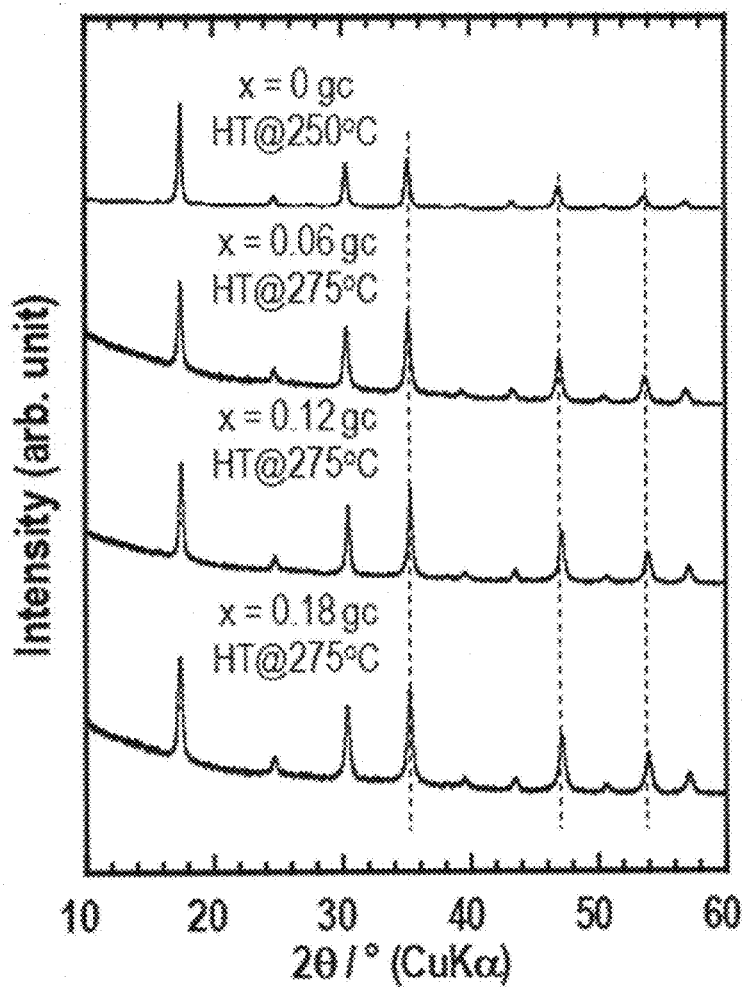
FIG. 7 shows XRD patterns of $Na_{3-x}Sb_{1-x}W_xS_4$ gc.

FIG. 7 shows XRD patterns of 4 types of gc pellets obtained. In FIG. 7, the pellets of x=0 and x=0.12 had 10 major peaks at the positions indicated below.

x=0 17.40, 24.95, 30.76, 35.23, 39.62, 43.53, 46.86, 50.83, 53.75, 57.37 (2θ)

x=0.12 17.40, 24.78, 30.42, 35.28, 39.64, 43.56, 47.24, 50.80, 54.04, 57.20 (2θ)

The pellets of x=0.06 and x=0.18 had 10 major peaks like the pellets of x=0.12. The 10 major peaks of the pellets of x=0.06 and x=0.18 were within ±0.3 (2θ) of the positions of the 10 major peals of the pellets of x=0.12. It is demonstrated in FIG. 7 that the crystallinity increased by heat treatment and no obvious peak shift is observed even when the level of substitution of Sb with W is increased.

(7) Impedance Plots of $Na_{2.88}Sb_{0.88}W_{0.12}S_4$ gc of Example 1

Figure 8:
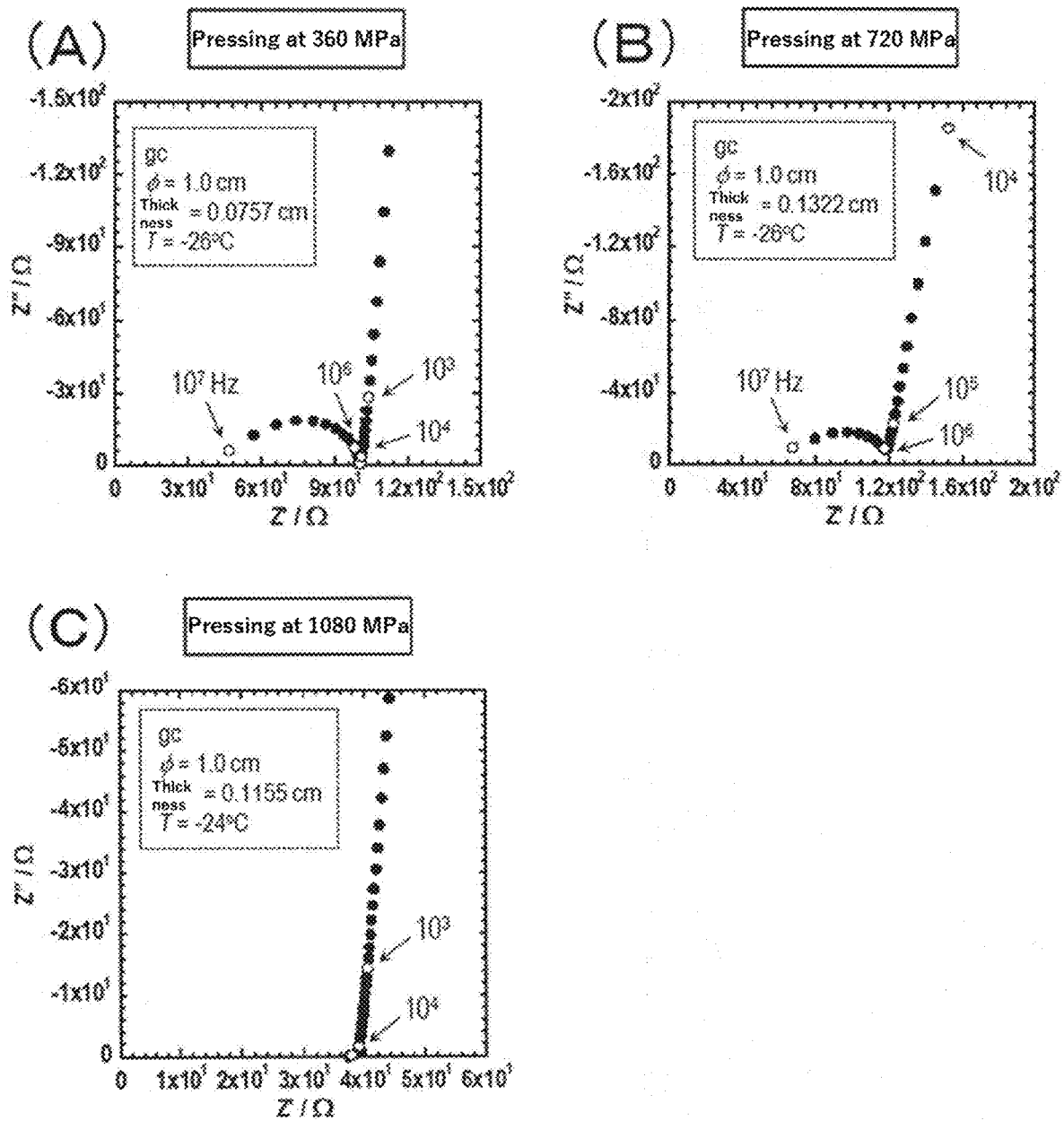
FIG. 8 shows impedance plots of $Na_{2.88}Sb_{0.88}W_{0.12}S_4$ gc.

FIG. 8 (A) to (C) show impedance plots of $Na_{2.88}Sb_{0.88}W_{0.12}S_4$ gc used in Example 1. It is found from FIG. 8 (A) to (C) that the electric conductivity increases as the pressure increases.

(8) Measurements of Ionic Conductivity and Activation Energy of $Na_{3-x}Sb_{1-x}W_xS_4$ gc of Example 1

Figure 9:
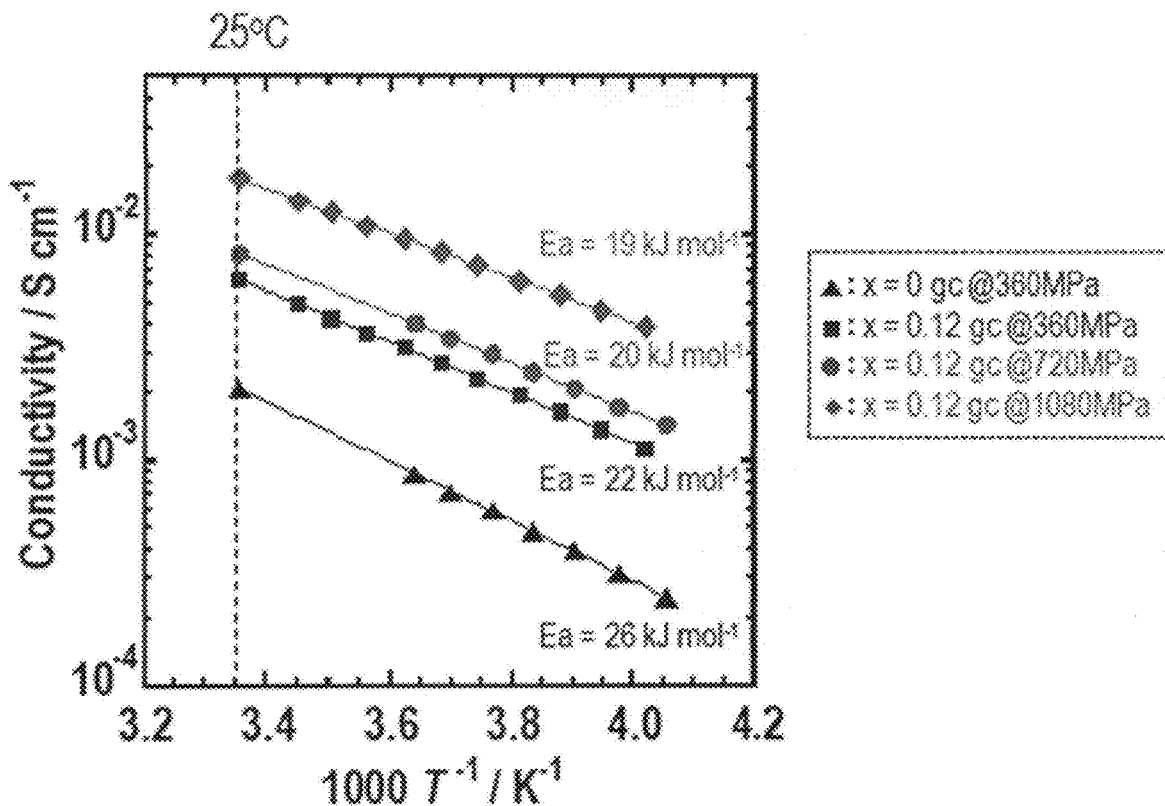
FIG. 9 shows ionic conductivity and activation energy of $Na_{3-x}Sb_{1-x}W_xS_4$ gc.

FIG. 9 shows the ionic conductivity and activation energy measured with the pellet without W substitution and pellets of $Na_{3-x}Sb_{1-x}W_xS_4$ gc (x=0.12) at different pressures. It is found from FIG. 9 that the electric conductivity increases as the pressure increases, and the ionic conductivity exhibited at room temperature is above $1.0 \times 10^{-2}$ Scm$^{-1}$ when pressing is carried out at 1080 MPa.

(9) Direct-Current Polarization and Electronic Conductivity of $Na_{2.88}Sb_{0.88}W_{0.12}S_4$ gc of Example 1

Figure 10:
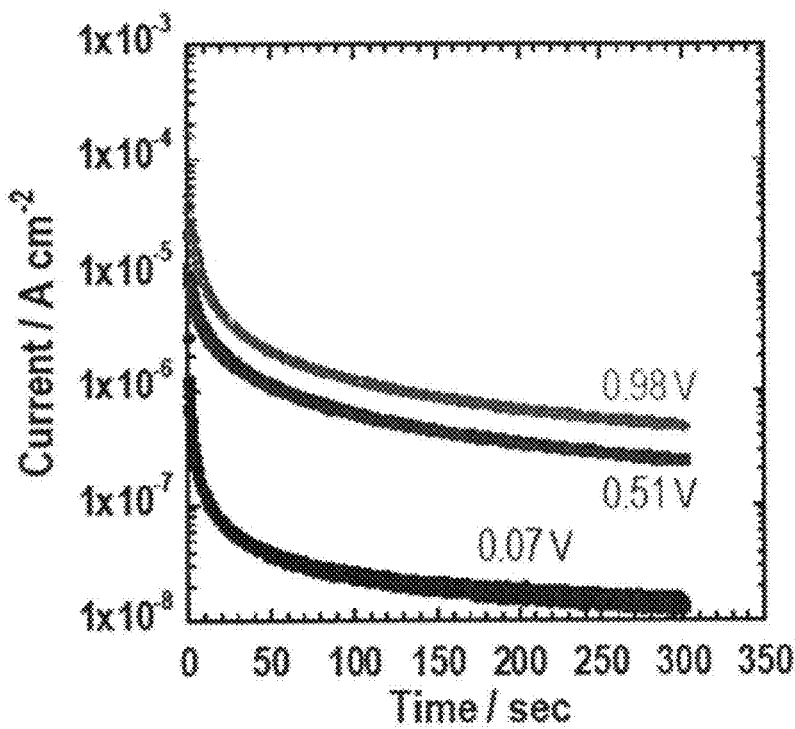
FIG. 10 shows direct-current polarization characteristics of $Na_{2.88}Sb_{0.88}W_{0.12}S_4$ gc.
Figure 11:
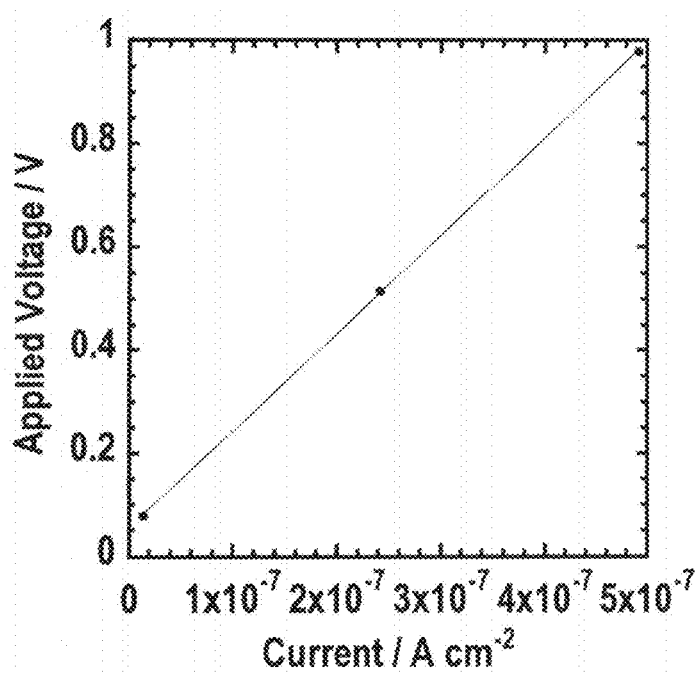
FIG. 11 shows the relationship between voltage and current during direct-current polarization.

FIG. 10 shows the direct-current polarization measured with $Na_{2.88}Sb_{0.88}W_{0.12}S_4$ gc, and FIG. 11 shows the relationship between the voltage and current in the direct-current polarization method. Table 5 shows the electronic conductivity of $Na_{2.88}Sb_{0.88}W_{0.12}S_4$ gc measured.

TABLE 5

| Sample | Pressure | Ionic conductivity | Electronic conductivity |
|---|---|---|---|
| $Na_{2.88}Sb_{0.88}W_{0.12}S_4$ | 1080 MPa | $1.7 \times 10^{-2}$ | $7.9 \times 10^{-8}$ |

It is found from the values in Table 5 that the electronic conductivity of $Na_{2.88}Sb_{0.88}W_{0.12}S_4$ gc is considerably lower than the ionic conductivity.

(10) Temperature Dependence of Ionic Conductivity of $Na_{2.88}Sb_{0.88}W_{0.12}S_4$ of Example 1

Figure 12:
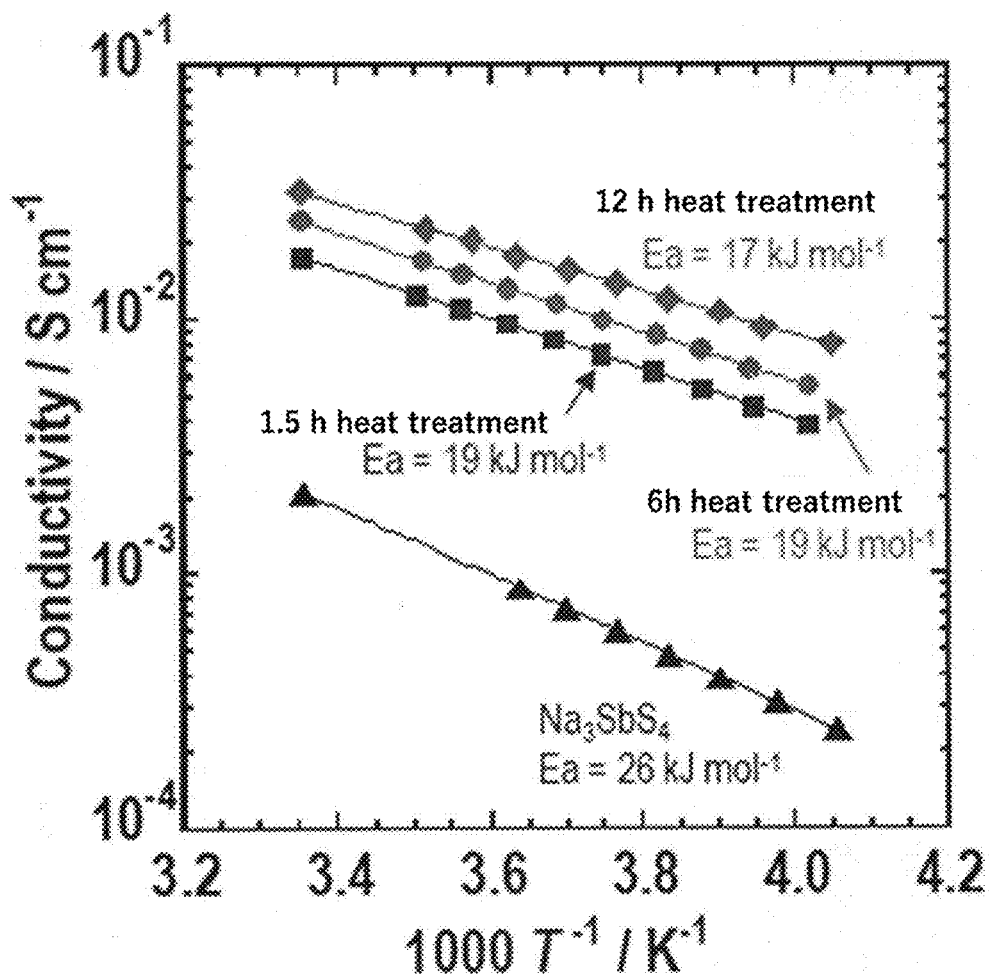
FIG. 12 shows temperature dependence of ionic conductivity of $Na_{2.88}Sb_{0.88}W_{0.12}S_4$.

FIG. 12 shows the temperature dependence of the ionic conductivity of $Na_{2.88}Sb_{0.88}W_{0.12}S_4$ gc pellet samples obtained with different heating times during the preparation. It is found from FIG. 12 that a sample obtained with a long heating time shows a higher ionic conductivity than a sample obtained with a short heating time.

(11) Ionic Conductivity and Activation Energy of Pellets of Examples 1 and 3 and Comparative Example 1

Tables 6 and 7 show a summary of the ionic conductivity and activation energy of the pellets of Examples 1 and 3 and Comparative Example 1.

TABLE 6

| Composition | $Na_{3-x}Sb_{1-x}W_xS_4$ Milling time | | Pressure | Ionic conductivity/ S cm$^{-1}$ | Ea/ kJ mol$^{-1}$ |
|---|---|---|---|---|---|
| x = 0 | MM 5 h | ms | 360 MPa | $1.8 \times 10^{-3}$ | 25 |
| | | gc 250° C. | | $2.1 \times 10^{-3}$ | 26 |
| x = 0.06 | MM 30 h | ms | 360 MPa | $8.1 \times 10^{-4}$ | 27 |
| | | gc 275° C. | | $3.3 \times 10^{-3}$ | 25 |
| x = 0.12 | MM 15 h | gc 275° C. | 360 MPa | $6.9 \times 10^{-3}$ | 20 |
| | MM 30 h | ms | 360 MPa | $1.2 \times 10^{-3}$ | 26 |
| | | gc 275° C. | | $6.1 \times 10^{-3}$ | 22 |
| | | | 720 MPa | $8.3 \times 10^{-3}$ | 20 |
| | | | 1080 MPa | $1.7 \times 10^{-2}$ | 19 |
| x = 0.15 | MM 30 h | gc 275° C. | 360 MPa | $7.7 \times 10^{-3}$ | 22 |
| x = 0.18 | MM 30 h | gc 275° C. | 360 MPa | $4.4 \times 10^{-3}$ | 24 |
| w = 0.12, Cl = 0.06 | MM 30 h | gc 275° C. | 360 MPa | $4.4 \times 10^{-3}$ | 23 |

TABLE 7

| $Na_{2.88}Sb_{0.88}W_{0.12}S_4$ Milling time | | Pressure | Heat treatment time | Ionic conductivity/ S cm$^{-1}$ | Ea/ kJmol$^{-1}$ |
|---|---|---|---|---|---|
| MM 30 h | gc 275° C. | 1080 MPa | 1.5 h | $1.7 \times 10^{-2}$ | 19 |
| MM 30 h | gc 275° C. | 1080 MPa | 6.0 h | $2.4 \times 10^{-2}$ | 19 |
| MM 30 h | gc 275° C. | 1080 MPa | 12.0 h | $3.2 \times 10^{-2}$ | 17 |

It is found from the results that gc shows a higher ionic conductivity than ms and a pellet exhibiting a higher ionic conductivity can be obtained by heating during preparation of the pellet. It is also found that samples obtained with higher pressure exhibit a higher ionic conductivity. With regard to substitution of Sb with W, increasing the proportion of W does not always increase the electric conductivity, and the ionic conductivity is the highest when x=0.12. When x=0.12, the heat treatment time was 12 hours and the pressure was 1080 MPa, the ionic conductivity was the highest of $3.2 \times 10^{-2}$ Scm$^{-1}$, which value is above the ionic conductivity of the LGPS electrolyte $Li_{9.54}Si_{1.74}P_{1.44}S_{11.7}Cl_{0.3}$ ($2.5 \times 10^{-2}$ Scm$^{-1}$) which shows the highest value among lithium ion conductors.

(12) Crystallinity of $Na_3SbS_4$ and $Na_{2.88}Sb_{0.88}W_{0.12}S_4$

Figure 13:
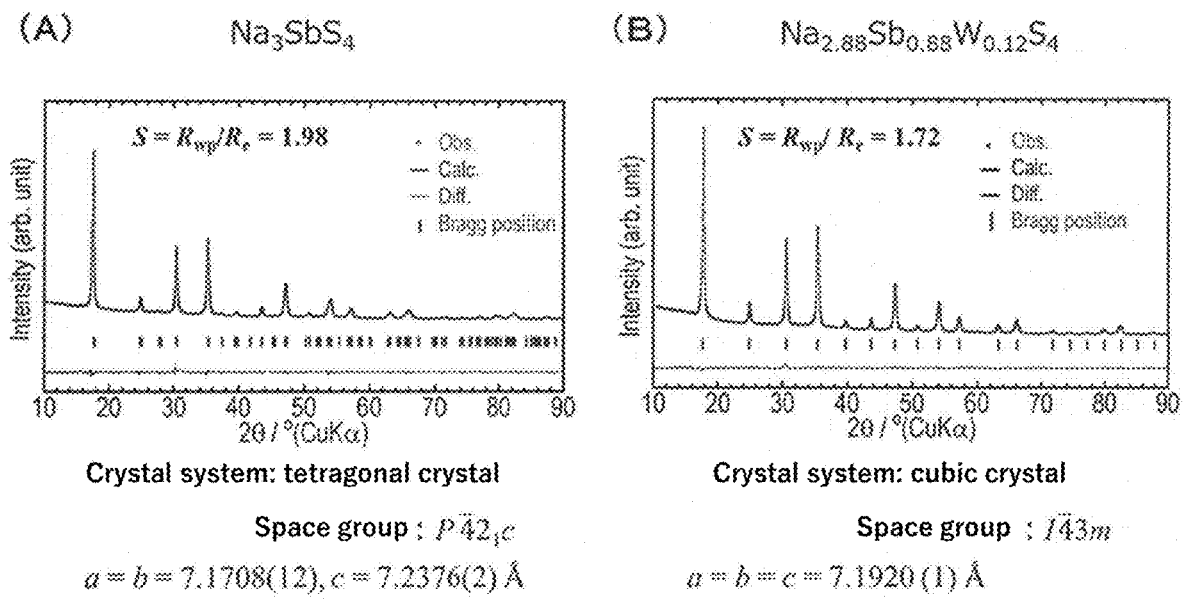
FIG. 13 shows XRD patterns of $Na_3SbS_4$ and $Na_{2.88}Sb_{0.88}W_{0.12}S_4$.
Figure 14:
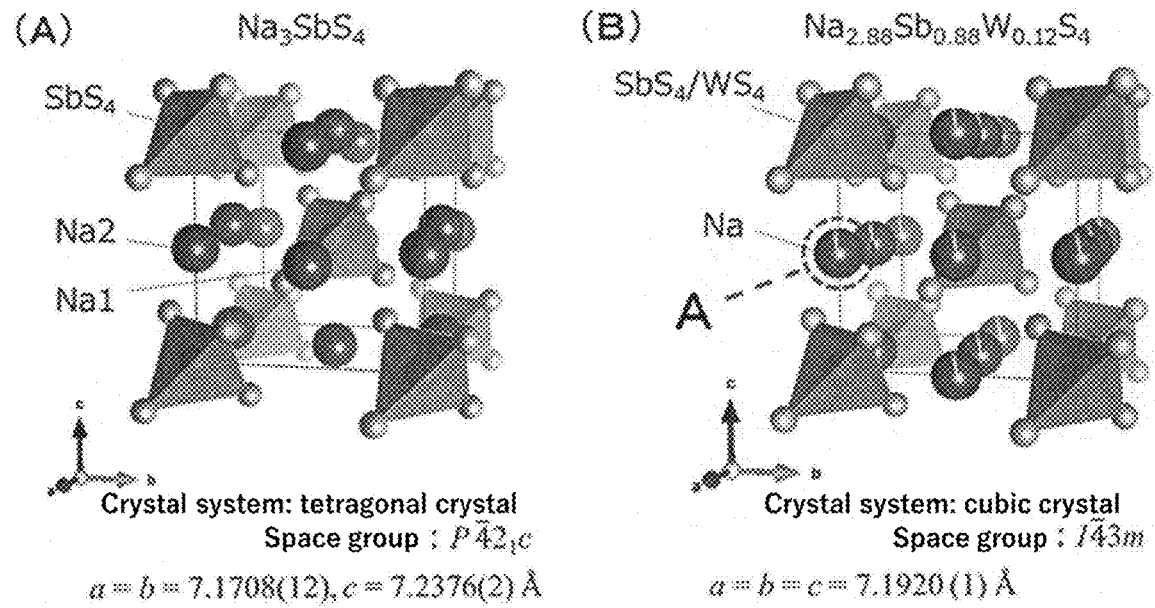
FIG. 14 shows tetragonal crystal structure of $Na_3SbS_4$ and the cubic crystal structure of $Na_{2.88}Sb_{0.88}W_{0.12}S_4$.

FIGS. 13 (A) and (B) show XRD patterns of $Na_3SbS_4$ and $Na_{2.88}Sb_{0.88}W_{0.12}S_4$. As shown in FIGS. 13 (A) and (B), substituting some Sb in $Na_3SbS_4$ with W causes a crystal structure change from a tetragonal crystal to a cubic crystal. FIGS. 14 (A) and (B) show the structures of the tetragonal crystal of $Na_3SbS_4$ and the cubic crystal of $Na_{2.88}Sb_{0.88}W_{0.12}S_4$. As shown in FIGS. 14 (A) and (B), the cubic crystal structure is highly symmetric compared to the tetragonal crystal, and thus ions can easily pass through the cubic crystal. In addition, $Na_{3-x}Sb_{1-x}W_xS_4$ has defects of Na ion (Na vacancy sites A's) generated therein (for example, Na occupancy 96%) unlike the tetragonal crystal, and thus the ionic conductivity increases.

(13) Ionic Conductivity and Activation Energy of $Na_{3-x}Sb_{1-x}Mo_xS_4$ of Example 2

Table 8 shows the results of measurements of the ionic conductivity and activation energy of the $Na_{3-x}Sb_{1-x}Mo_xS_4$ pellets of Example 2.

TABLE 8

| $Na_{3-x}Sb_{1-x}Mo_xS_4$ | | Ionic conductivity/S cm$^{-1}$ | Ea/kJ mol$^{-1}$ |
| --- | --- | --- | --- |
| x = 0 | ms | $1.8 \times 10^{-3}$ | 25 |
| | gc 250° C. | $2.1 \times 10^{-3}$ | 26 |
| x = 0.12 | gc 250° C. | $3.9 \times 10^{-3}$ | 21 |
| x = 0.18 | gc 250° C. | $2.9 \times 10^{-3}$ | 22 |

It is found from the results that Mo-substituted samples show higher electric conductivity than the sample without substitution.

(14) Temperature Dependence of Ionic Conductivity of Example 3

Figure 15:
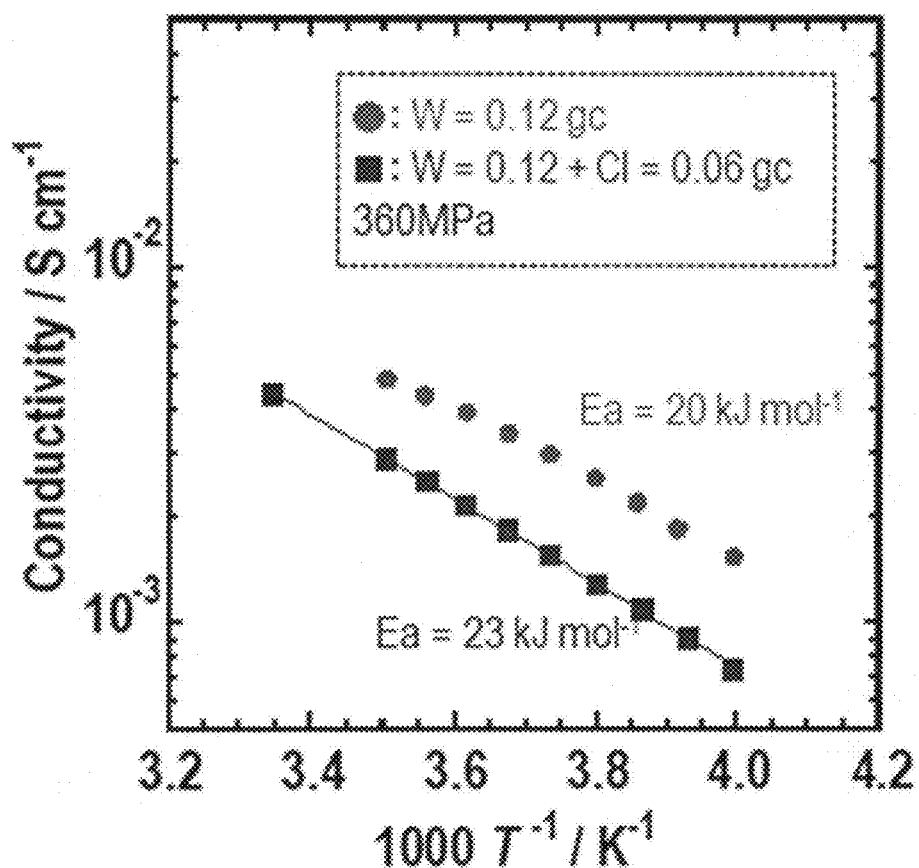
FIG. 15 shows temperature dependence of ionic conductivity of $Na_{2.82}Sb_{0.88}W_{0.12}S_{3.94}Cl_{0.06}$ gc.

FIG. 15 shows the temperature dependence of the ionic conductivity of $Na_{2.82}Sb_{0.88}W_{0.12}S_{3.94}Cl_{0.06}$ of Example 3 and $Na_{2.88}Sb_{0.88}W_{0.12}S_4$. It is found from FIG. 15 that Cl substitution causes decreased ionic conductivity, which is still higher than that of x=0.

(15) Evaluation of Atmospheric Stability of $Na_{2.88}Sb_{0.88}W_{0.12}S_4$ of Example 4

Figure 16:
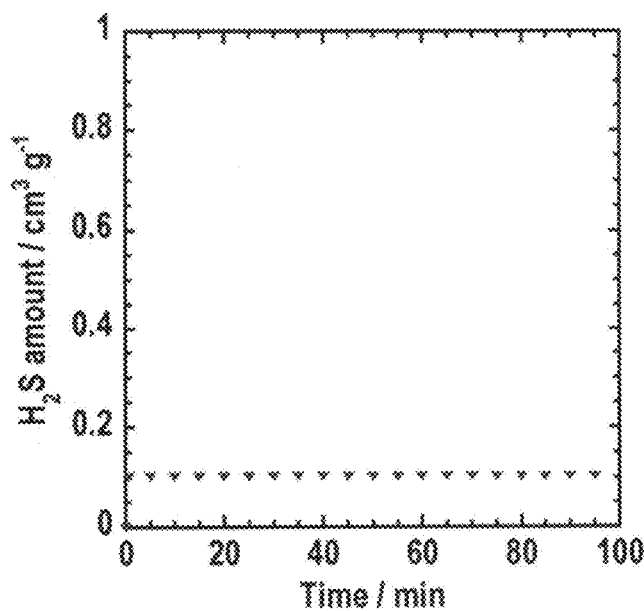
FIG. 16 shows the H$_2$S production from atmospherically-exposed Na$_{2.88}$Sb$_{0.88}$W$_{0.12}$S$_4$ gc.
Figure 17:
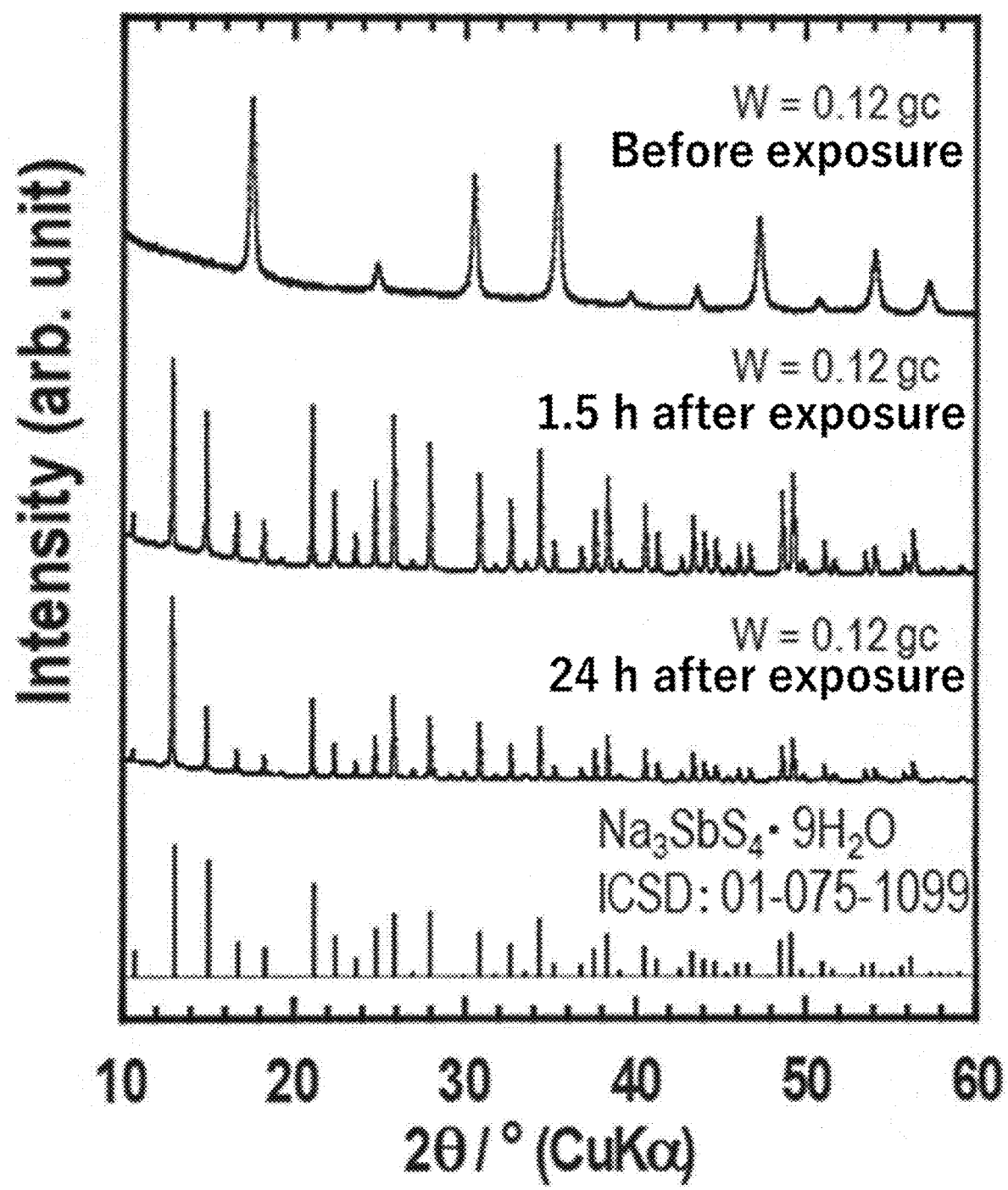
FIG. 17 shows XRD patterns of atmospherically-exposed Na$_{2.88}$Sb$_{0.88}$W$_{0.12}$S$_4$ gc.

FIG. 16 and FIG. 17 show the atmospheric stability of $Na_{2.88}Sb_{0.88}W_{0.12}S_4$ in terms of the H$_2$S production and the XRD pattern, respectively. It is found from FIG. 16 that the H$_2$S production from $Na_{2.88}Sb_{0.88}W_{0.12}S_4$ after atmospheric exposure is extremely low. It is found from FIG. 17 that the XRD pattern observed after atmospheric exposure was similar to that of $Na_3SbS_4 \cdot 9H_2O$. From the results, it is considered that a hydrate is formed after atmospheric exposure, and thus the H$_2$S production is extremely low.

(16) Evaluation of Charge/Discharge Characteristics of All-Solid-State Battery Containing $Na_{2.88}Sb_{0.88}W_{0.12}S_4$ of Example 5

Figure 18:
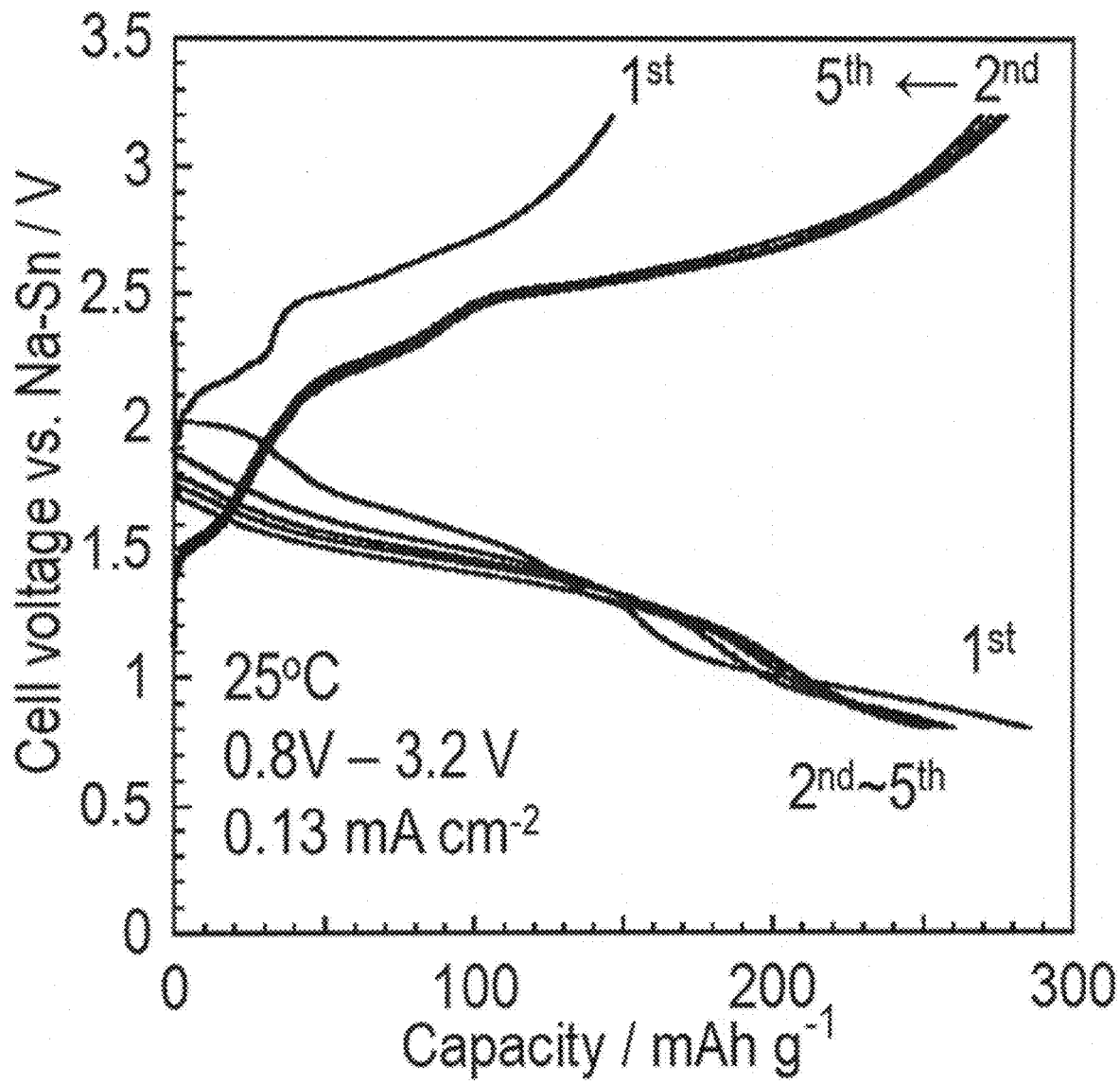
FIG. 18 is a graph illustrating discharge characteristics of Na$_{2.88}$Sb$_{0.88}$W$_{0.12}$S$_4$ gc contained in an all-solid-state batteries.

FIG. 18 shows the results of charge/discharge characteristics tests of the all-solid battery containing $Na_{2.88}Sb_{0.88}W_{0.12}S_4$. It is found from FIG. 18 that the present battery has high charge/discharge capacity above 250 mAh g$^{-1}$. From the above, it is found that $Na_{2.88}Sb_{0.88}W_{0.12}S_4$ is extremely useful as a solid electrolyte for all-solid-state sodium batteries.

(17) Impedance Plots of $Na_{2.88}Sb_{0.88}S_4$ ms and gc of Comparative Example 1

Figure 19:
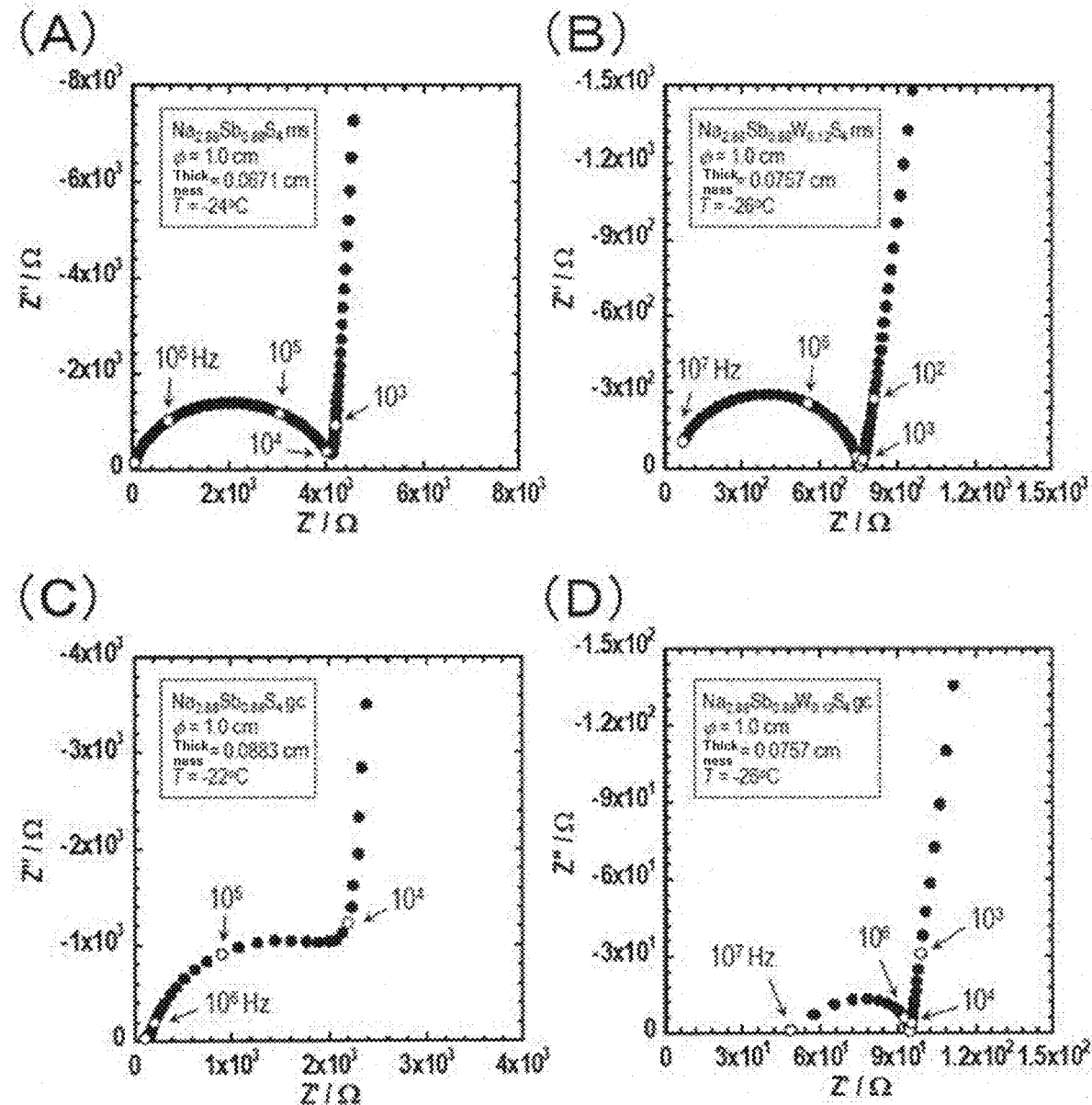
FIG. 19 shows impedance plots of Na$_{2.88}$Sb$_{0.88}$S$_4$ ms and gc.

FIG. 19 (A) to (D) show the difference in impedance between the non-substituted $Na_{2.88}Sb_{0.88}S_4$ sample and the W-substituted $Na_{2.88}Sb_{0.88}W_{0.12}S_4$ sample. It is found from FIG. 19 (A) to (D) that $Na_{2.88}Sb_{0.88}S_4$ shows a higher resistance than $Na_{2.88}Sb_{0.88}W_{0.12}S_4$.

(18) Temperature Dependence of Ionic Conductivity of $Na_{2.88}Sb_{0.88}S_4$ ms and gc of Comparative Example 1

Figure 20:
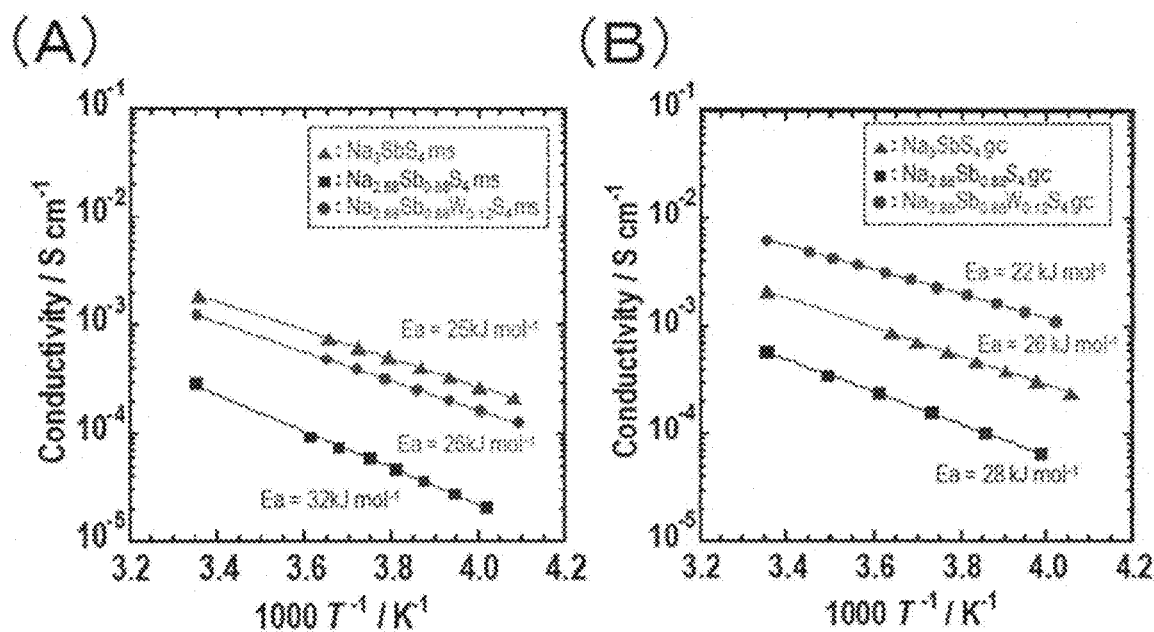
FIG. 20 shows temperature dependence of ionic conductivity of Na$_{2.88}$Sb$_{0.88}$S$_4$ ms and gc.

FIGS. 20 (A) and (B) show the difference in temperature dependence of the ionic conductivity between the non-substitution sample and the W-substituted samples. It is found from FIGS. 20 (A) and (B) that both $Na_{2.88}Sb_{0.88}S_4$ ms and gc show lower ionic conductivity than the W-substituted samples.

(19) Temperature Dependence of Ionic Conductivity of $Na_{3+x}Sb_{1-x}Sn_xS_4$ ms and gc of Comparative Example 2

Figure 21:
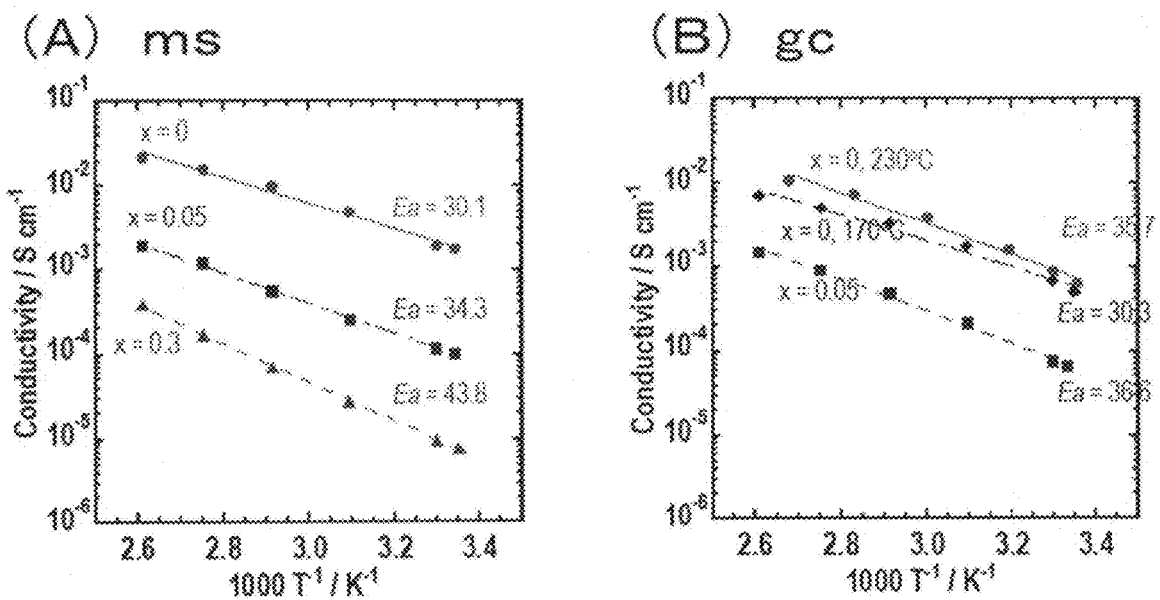
FIG. 21 shows temperature dependence of ionic conductivity of Na$_{3+x}$Sb$_{1-x}$Sn$_x$S$_4$ ms and gc.

FIGS. 21 (A) and (B) show the difference in temperature dependence of the ionic conductivity between the non-substitution samples and Sn-substituted samples. It is found from FIGS. 21 (A) and (B) that the activation energy increases as x increases within each category of ms or gc.

Table 9 shows the measurements of the ionic conductivity and activation energy of the $Na_{3+x}Sb_{1-x}Sn_xS_4$ samples.

TABLE 9

| $Na_{3+x}Sb_{1-x}Sn_xS_4$ | | Ionic conductivity/S cm$^{-1}$ | Ea/kJ mol$^{-1}$ |
| --- | --- | --- | --- |
| x = 0 | ms | $1.4 \times 10^{-3}$ | 30.1 |
| | gc 170° C. | $5.6 \times 10^{-4}$ | 30.3 |
| | gc 230° C. | $7.2 \times 10^{-4}$ | 35.7 |
| x = 0.05 | ms | $9.2 \times 10^{-5}$ | 37.3 |
| | gc 170° C. | $6.2 \times 10^{-5}$ | 36.6 |
| x = 0.3 | ms | $7.2 \times 10^{-5}$ | 43.8 |

It is found from the results that the ionic conductivity of Sn-substituted samples is lower than that of the non-substitution samples.

(20) Temperature Dependence of Ionic Conductivity of $Na_{3+x}Sb_{1-x}Si_xS_4$ ms and gc of Comparative Example 3

Figure 22:
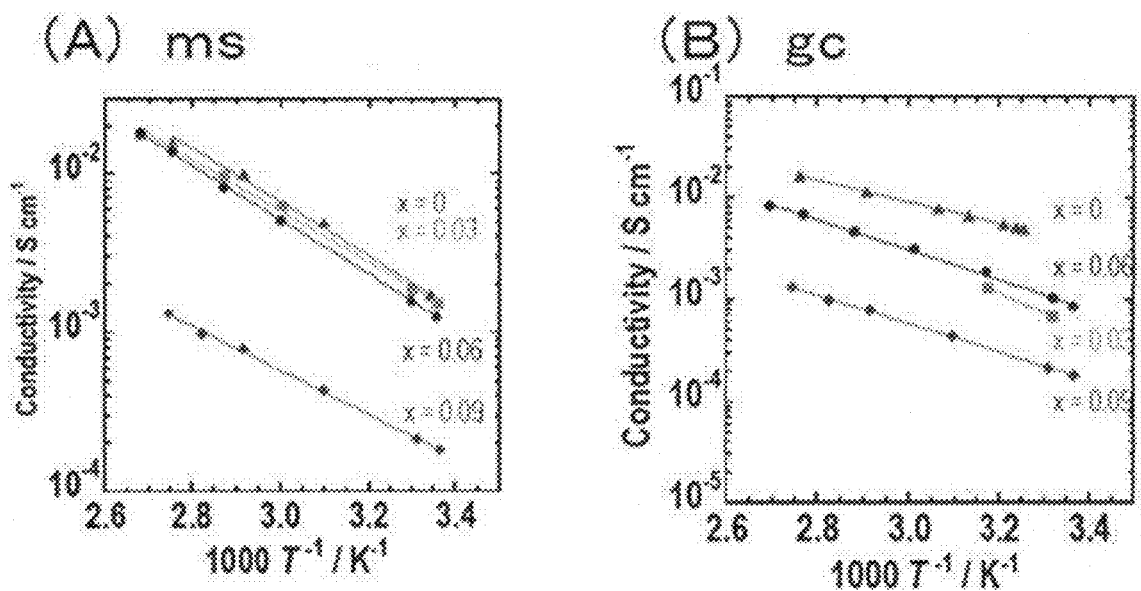
FIG. 22 shows temperature dependence of ionic conductivity of Na$_{3+x}$Sb$_{1-x}$Si$_x$S$_4$ ms and gc.

FIGS. 22 (A) and (B) show the difference in temperature dependence of the ionic conductivity between the non-substitution samples and the Si-substituted samples. It is found from FIGS. 22 (A) and (B) that substitution of Sb with Si decreases ionic conductivity compared to the non-substituted samples.

Table 10 shows the measurements of the ionic conductivity and activation energy of the $Na_{3+x}Sb_{1-x}Si_xS_4$ samples.

TABLE 10

| $Na_{3+x}Sb_{1-x}Si_xS_4$ | | Ionic conductivity/S cm$^{-1}$ | | Ea/kJ mol$^{-1}$ |
| --- | --- | --- | --- | --- |
| x = 0 | ms | $1.4 \times 10^{-3}$ | | 30 |
| | gc 250° C. | $3.8 \times 10^{-3}$ | | 21 |
| x = 0.03 | ms | $1.6 \times 10^{-3}$ | | 30 |
| | gc 260° C. | $8.5 \times 10^{-4}$ | (24° C.) | — |

TABLE 10-continued

| $Na_{3+x}Sb_{1-x}Si_xS_4$ | | Ionic conductivity/S cm$^{-1}$ | Ea/kJ mol$^{-1}$ |
|---|---|---|---|
| x = 0.06 | ms | 1.3 × 10$^{-3}$ | 32 |
| | gc 270° C. | 9.3 × 10$^{-4}$ | 28 |
| x = 0.09 | ms | 4.4 × 10$^{-4}$ | 36 |
| | gc 280° C. | 1.9 × 10$^{-5}$ | 26 |

It is found from the results that the Si-substituted gc samples have decreased ionic conductivity compared to the Si-substituted ms samples.

What is claimed is:

1. A solid electrolyte for an all-solid-state sodium battery, represented by formula:

$$Na_{3-x}Sb_{1-x}\alpha_xS_4$$

wherein α is selected from hexavalent elements wherein the hexavalent element is selected from W, Mo, Cr, Mn, Ru, Re, Os and Ir that provide $Na_{3-x}Sb_{1-x}\alpha_xS_4$ exhibiting a higher ionic conductivity than $Na_3SbS_4$, and x is 0<x<1.

2. The solid electrolyte for an all-solid-state sodium battery according to claim 1, wherein α is selected from W and Mo.

3. The solid electrolyte for an all-solid-state sodium battery according to claim 1, wherein α is W.

4. The solid electrolyte for an all-solid-state sodium battery according to claim 1, wherein x represents a value within a range that can provide the solid electrolyte exhibiting a higher ionic conductivity than $Na_3SbS_4$.

5. The solid electrolyte for an all-solid-state sodium battery according to claim 1, wherein x is 0.05≤x≤0.2.

6. The solid electrolyte for an all-solid-state sodium battery according to claim 1, which is in the form of glass ceramics.

7. The solid electrolyte for an all-solid-state sodium battery according to claim 1, comprising at least a crystalline part, wherein the crystalline part contains a cubic crystal.

8. The solid electrolyte for an all-solid-state sodium battery according to claim 1, exhibiting an anion peak derived from $\alpha S_4$ in a Raman spectrum.

9. A method for producing the solid electrolyte according to claim 1, comprising:

mixing raw materials for production of the solid electrolyte with mechanical milling wherein the raw materials are selected from $Na_2S$, $Sb_2S_3$, S, and αSz, wherein z is a number defined according to a valence of α; and pressing the obtained mixture.

10. The method for producing the solid electrolyte, according to claim 9, comprising, after pressing the mixture, heating the pressed mixture at a temperature of 200° C. to 550° C. for 0.1 hours or more.

11. An all-solid-state sodium battery comprising: a positive electrode, a negative electrode; and a solid electrolyte layer between the positive electrode and the negative electrode, wherein the solid electrolyte layer comprises the solid electrolyte according to claim 1.

12. The all-solid-state sodium battery according to claim 11, exhibiting a charge/discharge capacity of 250 mAh g$^{-1}$ or more.

* * * * *